(12) United States Patent
Hwang et al.

(10) Patent No.: US 12,018,118 B2
(45) Date of Patent: Jun. 25, 2024

(54) POLYESTER RESIN COMPRISING REGENERATED BIS(2-HYDROXYETHYL)TEREPHTHALATE AND FILM

(71) Applicant: SK CHEMICALS CO., LTD., Gyeonggi-do (KR)

(72) Inventors: Da-Young Hwang, Gyeonggi-do (KR); Sangwoo Kim, Gyeonggi-do (KR); Ha-Neul Kim, Gyeonggi-do (KR); Boo-Youn Lee, Gyeonggi-do (KR)

(73) Assignee: SK CHEMICALS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/569,279

(22) PCT Filed: Apr. 18, 2023

(86) PCT No.: PCT/KR2023/005206
§ 371 (c)(1),
(2) Date: Dec. 12, 2023

(87) PCT Pub. No.: WO2023/204561
PCT Pub. Date: Oct. 26, 2023

(65) Prior Publication Data
US 2024/0158568 A1    May 16, 2024

(30) Foreign Application Priority Data

Apr. 20, 2022   (KR) .................... 10-2022-0049113

(51) Int. Cl.
| | |
|---|---|
| *C08G 63/06* | (2006.01) |
| *B29C 48/00* | (2019.01) |
| *B29C 48/08* | (2019.01) |
| *B29K 67/00* | (2006.01) |
| *C08G 63/183* | (2006.01) |
| *C08G 63/199* | (2006.01) |
| *C08G 63/664* | (2006.01) |
| *C08G 63/85* | (2006.01) |
| *C08L 67/03* | (2006.01) |

(52) U.S. Cl.
CPC .......... *C08G 63/065* (2013.01); *B29C 48/022* (2019.02); *B29C 48/08* (2019.02); *C08G 63/183* (2013.01); *C08G 63/199* (2013.01); *C08G 63/664* (2013.01); *C08G 63/85* (2013.01); *C08L 67/03* (2013.01); *B29K 2067/04* (2013.01); *C08L 2201/08* (2013.01); *C08L 2207/20* (2013.01)

(58) Field of Classification Search
CPC .................... C08L 2555/34; C08L 2207/20
See application file for complete search history.

(56) References Cited

U.S. PATENT DOCUMENTS

| 7,211,193 B2 | 5/2007 | Inada et al. |
| 2004/0019234 A1 | 1/2004 | Inada et al. |

FOREIGN PATENT DOCUMENTS

| JP | 2003055300 A | * | 2/2003 | ............. C08J 11/24 |
| JP | 2003055300 A | | 2/2003 | |
| KR | 10-1386683 B1 | | 4/2014 | |
| KR | 20200061948 A | | 6/2020 | |
| KR | 20210067554 A | | 6/2021 | |
| WO | 2021028695 A1 | | 2/2021 | |
| WO | WO-2021028695 A1 | * | 2/2021 | ............. C07C 29/09 |

OTHER PUBLICATIONS

JP2003055300 English machine translation based on OCR text, prepared Feb. 13, 2024. (Year: 2024).*
Sang Ho Park et al., Poly (ethylene terephthalate) recycling for high value added textiles, Fashion and Textiles, 2014, pp. 1-17, 1:1, Springer.

* cited by examiner

*Primary Examiner* — Christopher M Rodd
(74) *Attorney, Agent, or Firm* — IP & T GROUP LLP

(57) ABSTRACT

A polyester resin comprising regenerated BHET according to an embodiment has excellent heat resistance characteristics since a diethylene glycol generated from the regenerated BHET to remain in the polyester resin is adjusted to a predetermined level or less, so that the polyester resin can be manufactured into a heat-shrinkable film.

14 Claims, No Drawings

POLYESTER RESIN COMPRISING REGENERATED BIS(2-HYDROXYETHYL)TEREPHTHALATE AND FILM

This application is a national stage application of PCT/KR2023/005206 filed on Apr. 18, 2023, which claims priority of Korean patent application number 10-2022-0049113 filed on Apr. 20, 2022. The disclosure of each of the foregoing applications is incorporated herein by reference in its entirety.

TECHNICAL FIELD

The present invention relates to a polyester resin comprising recycled bis(2-hydroxyethyl) terephthalate and to a film prepared using the same.

BACKGROUND ART

Polyester is widely used as a material for beverage-filling containers, packaging films, audio and video films, and the like by virtue of its excellent mechanical strength, thermal resistance, transparency, and gas barrier properties. In addition, polyester is widely produced worldwide as an industrial material such as medical fibers and tire cords. In particular, polyester sheets or plates have good transparency and excellent mechanical strength, so that they are widely used as raw materials for cases, boxes, partitions, shelves, panels, packaging materials, building materials, interior and exterior materials, and the like.

As a result, waste of plastics such as polyester is generated globally at an unmanageable level every year. Recently, countries around the world are preparing regulations and plans for recycling waste plastic resources, including waste polyester. For example, there is an attempt to use a recycled resin in packaging materials used in various fields at a certain ratio or more. Although physical or chemical methods are used as methods of recycling waste polyester, physical recycling methods cannot guarantee purity and are not widely used.

In chemical recycling methods, the ester bond of waste polyester is cleaved to depolymerize it. Reactions such as glycolysis, hydrolysis, methanolysis, and aminolysis are used. Glycolysis among them is to decompose waste polyester by adding a glycol such as ethylene glycol or diethylene glycol at high temperatures. A reaction product containing mainly bis(2-hydroxyethyl) terephthalate (BHET) is obtained. The bis(2-hydroxyethyl) terephthalate may be used as a raw material for preparing unsaturated polyester or ester polyol after the crystallization or purification thereof.

PRIOR ART DOCUMENT (Patent Document 1) Korean Patent No. 1386683
(Patent Document 02) U.S. Pat. No. 7,211,193
(Non-patent Document 1) Park, S. H., Kim, S. H., Poly(ethylene terephthalate) recycling for high value added textiles, Fashion and Textiles 1,1 (2014)

DISCLOSURE OF INVENTION

Technical Problem

When a polyester resin is prepared using bis(2-hydroxyethyl) terephthalate (BHET) obtained through the depolymerization of waste polyester, there is a problem in that the quality of a final polyester product is deteriorated due to impurities in the BHET.

As a result of research conducted by the present inventors to solve this problem, it has been discovered that diethylene glycol derivatives, which have been present as impurities in the recycled BHET used for the polymerization of a polyester resin, remain in the final polymerization resin, thereby affecting quality. They also impair the properties such as thermal shrinkage of a film produced therefrom.

Therefore, the present inventors have adjusted the diethylene glycol derivatives derived from recycled BHET and remaining as impurities in a polyester resin to a certain level or less, whereby it is possible to enhance the thermal resistance of the resin and to prevent the deterioration of the thermal shrinkage characteristics of a film produced therefrom.

Accordingly, an object of the present invention is to provide a regenerated polyester resin having a quality equivalent to that of a virgin resin even though it is prepared through chemical recycling and an article comprising the same, especially, a heat shrinkable film.
Solution to Problem According to the present invention, there is provided a polyester resin, which comprises recycled bis(2-hydroxyethyl) terephthalate obtained through the depolymerization of waste polyester, wherein the slope of heat shrinkage rate calculated by the following Equation (A) is 600%/° C. or less.

$$\text{Slope } (\%/°C.) = \frac{HS1\ (\%) - HS2\ (\%)}{5°C.} \times 100 \tag{A}$$

In Equation (A), HS1 is the heat shrinkage rate (%) at the glass transition temperature (Tg), and HS2 is the heat shrinkage rate (%) at a temperature of the glass transition temperature (Tg) −5° C., wherein, after the polyester resin is extrusion molded into a film shape and then stretched 5 times in the transverse direction (TD), the heat shrinkage rate is measured in the transverse direction (TD) of the film at each temperature.

In addition, according to the present invention, there is provided a process for preparing a polyester resin, which comprises polymerizing a polyester resin using recycled bis(2-hydroxyethyl) terephthalate obtained through the depolymerization of waste polyester, wherein the recycled bis(2-hydroxyethyl) terephthalate has a peak area fraction of diethylene glycol esters of less than 2% in total when measured by high-performance liquid chromatography (HPLC), and the slope of heat shrinkage rate calculated by the above Equation (A) in the polyester resin is 600%/° C. or less.

In addition, according to the present invention, there is provided an article, which comprises the polyester resin. In addition, according to the present invention, there is provided a heat shrinkable polyester film, which comprises the polyester resin.
Advantageous Effects of Invention In the polyester resin according to the present invention, diethylene glycol derivatives derived from recycled BHET and remaining in the polyester resin are adjusted to a certain level or less. Thus, even though it is a polyester resin regenerated through chemical recycling, it is hardly deteriorated in quality such as thermal resistance as compared with a virgin resin.

Accordingly, articles manufactured using the polyester resin according to the present invention are environmentally friendly products and have excellent quality. In particular, a polyester film has excellent thermal resistance to show uniform heat shrinkage characteristics and has an appropriate slop of heat shrinkage rate with respect to temperature, so that it can be used as a packaging material such as a heat shrinkable film in various fields.

BEST MODE FOR CARRYING OUT THE INVENTION

Hereinafter, the present invention will be described in more detail.

In this specification, terms referring to the respective components are used to distinguish them from each other and are not intended to limit the scope of the embodiment. In addition, in the present specification, a singular expression is interpreted to cover a plural number as well unless otherwise specified in the context.

In the present specification, the terms first, second, and the like are used to describe various components. But the components should not be limited by the terms. The terms are used for the purpose of distinguishing one element from another.

In the present specification, the term "comprising" is intended to specify a particular characteristic, region, step, process, element, and/or component. It does not exclude the presence or addition of any other characteristic, region, step, process, element and/or component, unless specifically stated to the contrary.

Bis(2-hydroxyethyl) terephthalate

The polyester resin according to the present invention comprises bis(2-hydroxyethyl) terephthalate obtained by the depolymerization of waste polyester.

Bis(2-hydroxyethyl) terephthalate is an ester of two ethylene glycols and one terephthalic acid. For example, it is a compound formed as an intermediate in the process of preparing polyester such as polyethylene terephthalate (PET) through the polymerization of ethylene glycol and terephthalic acid or its ester.

Bis(2-hydroxyethyl) terephthalate (BHET), which is used as a polymerization raw material for the polyester resin according to the present invention, is obtained from waste polyester having a repeat unit of ethylene glycol and terephthalic acid like polyethylene terephthalate (PET) or glycol-modified polyethylene terephthalate (PETG). For example, it may be obtained by well-known depolymerization methods such as glycolysis, hydrolysis, and methanolysis.

In the present specification, bis(2-hydroxyethyl) terephthalate (BHET) obtained by the depolymerization of waste polyester as described above is referred to as "recycled bis(2-hydroxyethyl) terephthalate (recycled BHET)," or abbreviated as r-BHET or rBHET, which needs to be understood as distinct from a pure BHET compound.

Specifically, recycled BHET may contain reagents or solvents used in various chemical steps during the depolymerization of waste polyester, or by-products formed by side reactions with them. These impurities may remain in trace amounts even after several rounds of purification. Thus, recycled BHET generally contains trace amounts of organic and inorganic impurities in addition to BHET as the main component. For this reason, recycled BHET can also be viewed as a kind of composition comprising two or more components, i.e., a BHET composition. It may be used as a polymerization raw material for producing a polyester resin.

Specifically, recycled BHET may comprise trace amounts of a heterogeneous organic component, such as BHET analogs such as monohydroxyethyl terephthalic acid (MHET), BHET dimers, BHET trimers, by-products such as diethylene glycol esters, metal ions as inorganic components, and residual solvent components in addition to BHET as the main component.

In the present invention, recycled BHET in which the content of such heterogeneous organic components is adjusted to a certain range is used. The content of each component in recycled BHET can be derived by measuring the fraction (%) of a peak area out of the total peak area in a spectrum obtained using high-performance liquid chromatography (HPLC).

Specifically, the recycled bis(2-hydroxyethyl) terephthalate (BHET) as a raw material in the present invention has a peak area fraction of BHET of 96% or more when measured by high-performance liquid chromatography (HPLC). More specifically, the peak area fraction of BHET measured by HPLC may be 96.5% or more, 97% or more, 97.5% or more, or 98% or more.

In addition, the recycled bis(2-hydroxyethyl) terephthalate may have a peak area fraction of organic impurities measured by HPLC of less than 5% in total, specifically, less than 4%, less than 3%, less than 2%, less than 1%, or less than 0.7%.

In particular, the polyester resin according to the present invention comprises recycled BHET in which the content of diethylene glycol esters (DEG esters) is adjusted to a certain level or less. For example, the recycled bis(2-hydroxyethyl) terephthalate may have a peak area fraction of diethylene glycol ester compounds of less than 2% in total when measured by HPLC. Specifically, the peak area fraction of diethylene glycol ester compounds may be less than 1.5%, less than 1%, less than 0.8%, or less than 0.7%, in total.

As an example, the diethylene glycol ester compounds may be a condensate between an aromatic dicarboxylic acid such as terephthalic acid and diethylene glycol. As another example, the diethylene glycol ester compounds may be a condensate between an aromatic dicarboxylic acid such as terephthalic acid and a glycol (e.g., ethylene glycol) in addition to diethylene glycol.

According to an embodiment, the recycled BHET may comprise 2-hydroxyethyl[2-(2-hydroxyethoxy)ethyl] terephthalate (CAS No. 65133-69-9) of the following Formula 1 as a first diethylene glycol ester. According to another embodiment, the recycled BHET may comprise bis[2-(2-hydroxyethoxy)ethyl]benzene-1,4-dicarboxylate (CAS No. 26850-76-0) of the following Formula 2 as a second diethylene glycol ester. If a polyester resin is prepared from recycled BHET in which the contents of the first diethylene glycol ester and the second diethylene glycol ester are adjusted to a certain level or less, even though it is a polyester resin regenerated through chemical recycling, it is hardly deteriorated in quality as compared with a virgin resin.

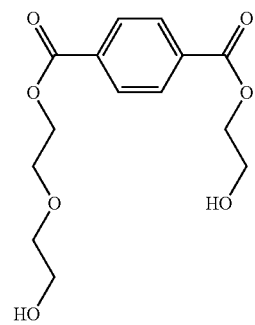

[Formula 1]

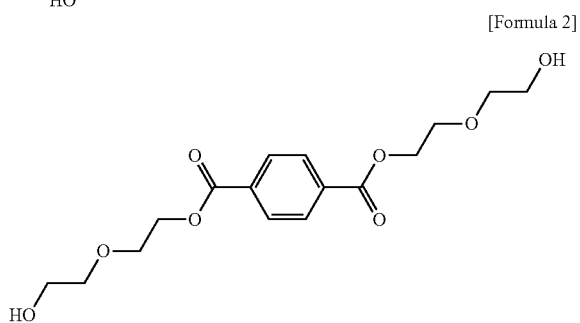

[Formula 2]

According to an embodiment, the recycled bis(2-hydroxyethyl) terephthalate (BHET) has a peak area fraction of 2-hydroxyethyl[2-(2-hydroxyethoxy)ethyl] terephthalate (first diethylene glycol ester) of 2.5% or less when measured by high-performance liquid chromatography (HPLC). Specifically, the peak area fraction of 2-hydroxyethyl[2-(2-hydroxyethoxy)ethyl] terephthalate measured by HPLC may be 2.0% or less, 1.5% or less, 1.0% or less, or 0.5% or less.

According to another embodiment, the recycled bis(2-hydroxyethyl) terephthalate (BHET) has a peak area fraction of bis [2-(2-hydroxyethoxy)ethyl]benzene-1,4-dicarboxylate (second diethylene glycol ester) of 0.5% or less when measured by high-performance liquid chromatography (HPLC). Specifically, the peak area fraction of bis[2-(2-hydroxyethoxy)ethyl]benzene-1,4-dicarboxylate measured by HPLC may be 0.2% or less, more specifically, 1.5% or less, 1.0% or less, or 0.5% or less.

In addition, the recycled bis(2-hydroxyethyl) terephthalate may have a peak area fraction of oligomers of 3% or less in total when measured by HPLC.

Specifically, the recycled bis(2-hydroxyethyl) terephthalate may have a peak area fraction of BHET dimers of less than 3%, less than 2%, less than 1%, or less than 0.7%, when measured by HPLC. In addition, the recycled bis(2-hydroxyethyl) terephthalate produced by the above process may have a peak area fraction of BHET trimers measured by HPLC of less than 1%, less than 0.5%, less than 0.3%, less than 0.1%, or 0%.

In addition, the recycled bis(2-hydroxyethyl) terephthalate may further comprise impurities having a structure similar to that of bis(2-hydroxyethyl) terephthalate. For example, it may comprise at least one selected from the group consisting of monohydroxyethyl terephthalic acid (MHET), bis(2-hydroxypropyl) terephthalate, and monohydroxyethylethoxy terephthalic acid. The impurities having a structure similar to that of bis(2-hydroxyethyl) terephthalate may have a peak area fraction of less than 3%, less than 2%, less than 1%, or less than 0.5%, when measured by HPLC.

In addition, the total content of residual solvents (e.g., ethylene glycol) in the recycled bis(2-hydroxyethyl) terephthalate may be less than 1% by weight based on a weight ratio detected by gas chromatography analysis. Specifically, the total content of residual solvents may be less than 0.5% by weight, less than 0.3% by weight, less than 0.2% by weight, less than 0.1% by weight, or less than 0.9% by weight.

In addition, the recycled bis(2-hydroxyethyl) terephthalate may have a yellow index (YID) of 3.0 or less as measured with a spectrophotometer in a solution of 25% by weight. Specifically, the yellow index may be 2.5 or less, 2.0 or less, 1.5 or less, or 1.0 or less.

In addition, the recycled bis(2-hydroxyethyl) terephthalate may have a total content of inorganic substances of less than 5 ppm as measured by inductively coupled plasma atomic emission spectroscopy (ICP-AES). Specifically, the total content of inorganic substances may be less than 3 ppm, less than 1 ppm, or nearly 0 ppm.

Composition of the polyester resin The polyester resin of the present invention is a polyester resin regenerated through the chemical recycling of waste polyester.

Specifically, since the polyester resin of the present invention is polymerized using recycled BHET, it comprises a repeat unit derived from recycled BHET in the polymer chain.

The content of recycled BHET in the polyester resin of the present invention may be 1% by weight or more, 5% by weight or more, 10% by weight or more, 30% by weight or more, 50% by weight or more, 70% by weight or more, or 90% by weight or more. In addition, the content of recycled BHET may be 100% by weight or less, 99% by weight or less, 80% by weight or less, 60% by weight or less, 40% by weight or less, or 20% by weight or less.

As an example, the recycled bis(2-hydroxyethyl) terephthalate may be employed in an amount of 10% by weight to 99% by weight based on the weight of the polyester resin.

Meanwhile, since bis(2-hydroxyethyl) terephthalate has a structure in which two ethylene glycols and one terephthalic acid are bonded, the polyester resin of the present invention may essentially comprise a repeat unit derived from ethylene glycol and terephthalic acid.

As described above, the polyester resin of the present invention comprises a diacid component and a glycol component as monomers constituting the same. In addition, the polyester resin of the present invention may further comprise an additional diacid component and an additional glycol component for the polymerization of polyester.

In the polyester resin of the present invention, the diacid component may be a dicarboxylic acid or a derivative thereof, and the glycol component may be a diol.

In particular, the dicarboxylic acid comprises terephthalic acid, and the physical properties such as thermal resistance, chemical resistance, and weather resistance of a polyester resin can be enhanced by terephthalic acid. For example, terephthalic acid may be employed in an amount of 5% by mole to 100% by mole based on the number of moles of the entire dicarboxylic acid. In addition, the terephthalic acid component may be formed from a terephthalic acid alkyl ester such as dimethyl terephthalic acid.

In addition, the diol comprises ethylene glycol, and ethylene glycol may contribute to enhancing the transparency and impact resistance of a polyester resin. For example, ethylene glycol may be employed in an amount of 5% by mole to 100% by mole based on the number of moles of the entire diol.

According to an embodiment, the polyester resin of the present invention may be a copolymerized resin comprising two or more dicarboxylic acid components and/or two or more diol components.

Specifically, the dicarboxylic acid component may further comprise an aromatic dicarboxylic acid component, an aliphatic dicarboxylic acid component, or a mixture thereof, other than terephthalic acid. The dicarboxylic acid other than terephthalic acid may be employed in an amount of 1% by mole to 30% by mole based on the weight of the entire dicarboxylic acid components.

The aromatic dicarboxylic acid component may be an aromatic dicarboxylic acid having 8 to 20 carbon atoms, preferably, 8 to 14 carbon atoms, or a mixture thereof. Examples of the aromatic dicarboxylic acid include isophthalic acid, naphthalenedicarboxylic acids such as 2,6-naphthalenedicarboxylic acid, diphenyl dicarboxylic acid, 4,4'-stilbendicarboxylic acid, 2,5-furandicarboxylic acid, 2,5-thiophenedicarboxylic acid, and the like, but it is not limited thereto.

The aliphatic dicarboxylic acid component may be an aliphatic dicarboxylic acid having 4 to 20 carbon atoms, preferably, 4 to 12 carbon atoms, or a mixture thereof. Examples of the aliphatic dicarboxylic acid include linear, branched, or cyclic aliphatic dicarboxylic acid components such as cyclohexanedicarboxylic acids such as 1,4-cyclohexanedicarboxylic acid and 1,3-cyclohexanedicarboxylic acid, phthalic acid, sebacic acid, succinic acid, isodecylsuccinic acid, maleic acid, fumaric acid, adipic acid, glutaric acid, azelaic acid, and the like, but it is not limited thereto. In addition, the diol component may further comprise a comonomer other than ethylene glycol. The comonomer may comprise, for example, at least one selected from the group consisting of cyclohexanedimethanol, cyclohexanedimethanol derivatives, isosorbide, and diethylene glycol.

The cyclohexanedimethanol (e.g., 1,2-cyclohexanedimethanol, 1,3-cyclohexanedimethanol, and 1,4-cyclohexanedimethanol) may contribute to enhancing the transparency and impact resistance of a polyester resin produced. For example, cyclohexanedimethanol may be employed in an amount of 5% by mole to 90% by mole based on the number of moles of the entire diol. The cyclohexanedimethanol derivative may be 4-(hydroxymethyl)cyclohexylmethyl-4-(hydroxymethyl)cyclohexanecarboxylate or 4-(4-(hydroxymethyl)cyclohexylmethoxymethyl)cyclohexylmethanol. The cyclohexanedimethanol derivatives may be employed in an amount of 0.1% by mole to 25% by mole based on the number of moles of the entire diol.

Isosorbide may enhance the processability of the final polyester resin. Although the transparency and impact resistance of a polyester resin are enhanced by the diol component of cyclohexanedimethanol and ethylene glycol, shear fluidization characteristics should be improved and the crystallization rate should be delayed for processability; however, it is difficult to achieve this effect with cyclohexanedimethanol and ethylene glycol alone. Thus, if isosorbide is employed as a diol component, the shear fluidization characteristics are improved and the crystallization rate is delayed while transparency and impact resistance are maintained, whereby it is possible to improve the processability of a polyester resin produced. Preferably, isosorbide may be employed in an amount of 0.1% by mole to 50% by mole based on the number of moles of the entire diol.

As a specific example, the polyester resin comprises a diacid component and a glycol component, wherein the diacid component may comprise at least one selected from the group consisting of terephthalic acid, isophthalic acid, dimethyl isophthalate, phthalic acid, dimethyl phthalate, phthalic anhydride, 2,6-naphthalenedicarboxylic acid, dimethyl 2,6-naphthalenedicarboxylate, diphenyl dicarboxylic acid, 1,4-cyclohexanedicarboxylic acid, 1,3-cyclohexanedicarboxylic acid, dimethyl 1,4-cyclohexanedicarboxylate, dimethyl 1,3-cyclohexanedicarboxylate, sebacic acid, succinic acid, isodecylsuccinic acid, maleic acid, maleic anhydride, fumaric acid, adipic acid, glutaric acid, and azelaic acid, and the glycol component may comprise at least one selected from the group consisting of isosorbide, ethylene glycol, 1,2-propanediol, 1,3-propanediol, 2-methyl-1,3-propanediol, 2-methylene-1,3-propanediol, 2-ethyl-1,3-propanediol, 2-isopropyl-1,3-propanediol, 2,2-dimethyl-1,3-propanediol, 1,4-butanediol, 2,3-butanediol, 3-methyl-1,5-pentanediol, 3-methyl-2,4-pentanediol, 1,6-hexanediol, 1,2-cyclohexanediol, 1,4-cyclohexanediol, diethylene glycol, 4-(hydroxymethyl)cyclohexylmethyl-4-(hydroxymethyl)cyclohexanecarboxylate, and 4-(4-(hydroxymethyl)cyclohexylmethoxymethyl)cyclohexylmethanol.

Characteristics of the Polyester Resin

According to the present invention, as the diethylene glycol derivatives derived from recycled BHET and remaining as impurities in a polyester resin are adjusted to a certain level or less, it is possible to enhance the thermal resistance of the resin and to prevent the deterioration of the thermal shrinkage characteristics of a film produced therefrom.

According to an embodiment, in the polyester resin according to the present invention, the slope of heat shrinkage rate calculated by the following Equation (A) is 600%/° C. or less.

$$\text{Slope }(\%/°C.) = \frac{HS1\ (\%) - HS2\ (\%)}{5°C.} \times 100 \tag{A}$$

In Equation (A), HS1 is the heat shrinkage rate (%) at the glass transition temperature (Tg), and HS2 is the heat shrinkage rate (%) at a temperature of the glass transition temperature (Tg) −5° C., wherein, after the polyester resin is extrusion molded into a film shape and then stretched 5 times in the transverse direction (TD), the heat shrinkage rate is measured in the transverse direction (TD) of the film at each temperature.

In the polyester resin according to the present invention, diethylene glycol derivatives derived from recycled BHET and remaining in the polyester resin are adjusted to a certain level or less. Thus, even though it is a polyester resin regenerated through chemical recycling, it is hardly deteriorated in quality such as thermal resistance as compared with a virgin resin. Accordingly, articles manufactured using the polyester resin according to the present invention are environmentally friendly products and have excellent quality. In particular, a polyester film has excellent thermal resistance to show uniform heat shrinkage characteristics and has an appropriate slop of heat shrinkage rate with respect to temperature, so that it can be used as a packaging material such as a heat shrinkable film in various fields.

For example, the slope of heat shrinkage rate according to Equation (A) may be 600%/° C. or less, 550%/° C. or less, 500%/° C. or less, 450%/° C. or less, 400%/° C. or less, or 350%/° C. or less. In addition, the slope of heat shrinkage rate may be, for example, 0%/° C. or more, 100%/° C. or more, 200%/° C. or more, or 300%/° C. or more. As a specific example, the slope of heat shrinkage rate may be 0%/° C. to 600%/° C. or 200%/° C. to 600%/° C.

According to another embodiment, in the polyester resin of the present invention, the amount of DEG formed as calculated by the following Equation (B) is 5% by mole or less.

Amount of DEG formed=amount of residual DEG− amount of DEG added (B)

In Equation (B), the amount of residual DEG is the content (% by mole) of diethylene glycol residue among the total glycol residues in the polyester resin measured by $^1$H-NMR, and the amount of DEG added is the content (% by mole) of a diethylene glycol monomer in the total glycol components added to the production of the polyester resin.

The amount of residual DEG is obtained by measuring the content of the diethylene glycol residue finally remaining in the polyester resin (a resin upon completion of the polymerization). The content of the diethylene glycol residue may be calculated as a molar ratio (% by mole) relative to all glycol (e.g., DEG, CHDM, EG, and the like) residues. The amount of residual DEG may be attributed to diethylene glycol that has not participated in the polymerization reaction or has been produced as a by-product. In addition, the amount of residual DEG may be attributed to a diethylene glycol derivative contained as an impurity in the recycled bis(2-hydroxyethyl) terephthalate or produced as a by-product during polymerization.

The amount of DEG added is calculated from the content of a diethylene glycol monomer used in a reaction (e.g., esterification reaction) for the polymerization of a polyester resin. The content of the diethylene glycol monomer may be calculated as a molar ratio (% by mole) relative to all glycol (e.g., DEG, CHDM, EG, and the like) components. The amount of DEG added may be attributed to a diethylene glycol monomer additionally added to the polymerization reaction. In addition, the amount of DEG added may be attributed to a diethylene glycol monomer remaining in the recycled bis(2-hydroxyethyl) terephthalate.

The amount of DEG formed in Equation (B) is calculated by subtracting the amount of DEG added from the amount of residual DEG. That is, the amount of DEG formed may correspond to a difference between the amount of diethylene glycol and its derivatives (e.g., esters) finally remaining in the polyester resin and the amount of the diethylene glycol monomer initially added to the polymerization of the polyester resin. Thus, the amount of DEG formed may be attributed to the amount of the diethylene glycol derivatives in addition to the diethylene glycol monomer added into the polymerization of the polyester resin. Specifically, the amount of DEG formed may be attributed to the amount of a diethylene glycol ester remaining in the recycled bis(2-hydroxyethyl) terephthalate.

For example, the amount of DEG formed may be 5% by mole or less, 4.5% by mole or less, 4.0% by mole or less, 3.5% by mole or less, 3.0% by mole or less, or 2.5% by mole or less. Meanwhile, the lower limit of the amount of DEG formed is not particularly limited, but it may be, for example, 0% by mole or more, greater than 0% by mole, 0.5% by mole or more, 1% by mole or more, 1.5% by mole or more, or 2.0% by mole or more. Meanwhile, the amount of DEG formed may have a negative value due to a decrease in the residual amount relative to the amount of DEG added for some factors. For example, the lower limit of the amount of DEG formed in such a case may be −5% by mole or more, −3% by mole or more, or −1% by mole or more.

Within the preferred range of the amount of DEG formed, it is possible to enhance the properties such as thermal shrinkage of a film produced from a polyethylene resin by way of suppressing the impacts of diethylene glycol derivatives, which have been present as impurities in the recycled BHET used for the polymerization of the polyester resin and remain in the final polymerization resin, upon the quality thereof.

In addition, according to the present invention, it is possible to provide a polyester resin having more enhanced quality such as thermal resistance by adjusting the content of recycled BHET and the glycol/acid ratio in the polyester resin.

In particular, a thermal resistance index of a final polyester resin calculated from the content of impurities such as diethylene glycol esters in recycled BHET associated with the amount of BHET used for the polymerization of polyester can be adjusted to a specific range.

According to an embodiment, a first thermal resistance index is calculated using the composition (contents of BHET and DEG esters) of the recycled BHET and the content of the recycled BHET in a polyester resin as parameters. The first thermal resistance index may be adjusted within a specific range. The first thermal resistance index is a thermal resistance index derived from recycled BHET supplied to the polymerization of a polyester resin, which is a numerical value of the decrease in thermal resistance caused by DEG impurities in the recycled BHET. If the first thermal resistance index is adjusted to a certain level or less, it may be controlled to have a level of thermal resistance similar to that of a virgin polyester resin polymerized from an acid and a glycol.

Specifically, the polyester resin has a first thermal resistance index of 1.0 or less as calculated by the following Equation (1).

$$\text{First thermal resistance index} = \frac{(DEG_1 + 2 \times DEG_2) \times rBHET}{BHET_0} \quad (1)$$

In Equation (1), $DEG_1$, $DEG_2$, and $BHET_0$ are each the peak area fraction (%) of 2-hydroxyethyl[2-(2-hydroxyethoxy)ethyl] terephthalate, bis[2-(2-hydroxyethoxy)ethyl] benzene-1,4-dicarboxylate, and bis(2-hydroxyethyl) terephthalate, when the recycled bis(2-hydroxyethyl) terephthalate is measured by high-performance liquid chromatography (HPLC), and rBHET is the weight fraction (%) of recycled bis(2-hydroxyethyl) terephthalate in the polyester resin. Only numerical values of these parameters ($DEG_1$, $DEG_2$, $BHET_0$, rBHET), exclusive of their units, are put in Equation (1) to calculate the first thermal resistance index (without a unit).

For example, the first thermal resistance index may be 1.0 or less, 0.9 or less, 0.8 or less, 0.7 or less, 0.6 or less, 0.5 or less, 0.4 or less, 0.3 or less, 0.2 or less, or 0.1 or less. In addition, the first thermal resistance index may be 0 or more, 0.1 or more, 0.2 or more, 0.3 or more, 0.4 or more, or 0.5 or more. As a specific example, the first thermal resistance index may be 0 to 1.0 or 0.1 to 1.0.

According to another embodiment, a second thermal resistance index is calculated using the molar ratio of glycol and diacid in the monomers constituting the polyester resin as parameters. The second thermal resistance index may be adjusted within a specific range. The second thermal resistance index is a numerical value related to the content of glycol and acid constituting the polyester resin. If the second thermal resistance index is adjusted, it is possible to polymerize a polyester resin without deterioration in thermal resistance even when a large amount of recycled BHET is used.

Specifically, the polyester resin has a second thermal resistance index of 1.6 or less as calculated by the following Equation (2).

Second thermal resistance index=$(G/A) \times 0.32+0.83$ (2)

In Equation (2), G and A are each the number of moles of glycol and the number of moles of diacid in the monomers constituting the polyester resin, and G/A is the mole ratio of glycol to diacid.

For example, the second thermal resistance index may be 1.6 or less, 1.5 or less, 1.4 or less, 1.3 or less, or 1.2 or less. In addition, the second thermal resistance index may be 0 or more, 0.5 or more, 1.0 or more, 1.1 or more, 1.2 or more, or 1.3 or more. As a specific example, the second thermal resistance index may be 0 to 1.6 or 1.0 to 1.6.

According to another embodiment, a third thermal resistance index is calculated using the first thermal resistance index and the second thermal resistance index as parameters. The third thermal resistance index may be adjusted within a specific range. Since the third thermal resistance index comprehensively considers the quality and amount of recycled BHET and the glycol/acid content of the polyester resin, it is possible to more effectively control the thermal resistance of a final polyester resin by adjusting the third thermal resistance index.

Specifically, the polyester resin has a third thermal resistance index of 2.6 or less, more specifically, 2.0 or less, as calculated by the following Equation (3).

Third thermal resistance index=first thermal resistance index+second thermal resistance index (3)

For example, the third thermal resistance index may be 2.0 or less, 1.9 or less, 1.8 or less, 1.7 or less, 1.6 or less, 1.5 or less, 1.4 or less, or 1.3 or less. In addition, the third thermal resistance index may be 0 or more, 0.5 or more, 1.0 or more, or 1.5 or more. As a specific example, the third thermal resistance index may be 0 to 2.0 or 1.0 to 2.0.

A polyester resin whose thermal resistance indices are adjusted may be hardly deteriorated in thermal resistance as compared with a virgin polyester resin. According to an embodiment, the polyester resin according to the present invention may have a ΔTg of 3.0 or less as calculated by the following equation. Specifically, ΔTg according to the following equation may be 2.5 or less. Specifically, ΔTg according to the following equation may be 2.0 or less or 1.5 or less.

$\Delta Tg(° C.)=Tg1-Tg2$

Here, Tg2 is the glass transition temperature (° C.) of a polyester resin polymerized using recycled BHET, and Tg1 is the glass transition temperature (° C.) of a polyester resin polymerized using ethylene glycol and terephthalic acid in molar equivalents to the recycled BHET.

The intrinsic viscosity of the polyester resin according to the present invention at 35° C. may be 0.5 dl/g or more, 0.6 dl/g or more, or 0.7 dl/g or more, and may be 1.2 dl/g or less, 1.1 dl/g or less, 1.0 dl/g or less, or 0.9 dl/g or less. For example, the polyester resin may have an intrinsic viscosity of 0.5 dl/g to 1.2 dl/g at 35° C. Specifically, the 5 resin may have an intrinsic viscosity of 0.5 dl/g to 0.9 dl/g at 35° C.

Process for Preparing a Polyester Resin

The process for preparing polyester resin according to the present invention comprises polymerizing a polyester resin using recycled bis(2-hydroxyethyl) terephthalate (BHET) obtained through the depolymerization of waste polyester.

The polyester resin according to the present invention may be prepared by further adding terephthalic acid or a derivative thereof and/or ethylene glycol in addition to the recycled bis(2-hydroxyethyl) terephthalate. In addition, the polyester resin may be prepared as a copolymer by further adding comonomers of other diacids and/or glycols.

In the polymerization, an esterification reaction (step 1) and a polycondensation reaction (step 2) may be sequentially carried out.

The esterification reaction may be carried out in the presence of an esterification reaction catalyst. For example, a zinc-based compound may be used. Specific examples of the zinc-based catalyst include zinc acetate, zinc acetate hydrate, zinc chloride, zinc sulfate, zinc sulfide, zinc carbonate, zinc citrate, zinc gluconate, or mixtures thereof.

The esterification reaction may be carried out, for example, at a pressure of 0 kgf/cm$^2$ to 10.0 kgf/cm$^2$ and a temperature of 150° C. to 300° C. The esterification reaction conditions may be appropriately adjusted according to the specific characteristics of the polyester to be produced, the ratio of each component, or process conditions. Specifically, the pressure in the esterification reaction may be 0 kg/cm$^2$ to 5.0 kg/cm$^2$, more specifically, 0.1 kg/cm$^2$ to 3.0 kg/cm$^2$. In addition, the temperature in the esterification reaction may be 200° C. to 270° C., more specifically, 240° C. to 260° C.

The esterification reaction may be carried out in a batch or continuous type. Although each of the raw materials may be separately fed, it is preferable to feed them in the form of a slurry in which a diol component, a dicarboxylic acid component, and recycled BHET are mixed. In addition, a diol component such as isosorbide, which is solid at room temperature, may be dissolved in water or ethylene glycol and then mixed with a dicarboxylic acid component such as terephthalic acid to prepare a slurry. Alternatively, isosorbide may be melted at 60° C. or higher, which is then mixed with a dicarboxylic acid component such as terephthalic acid and other diol components to prepare a slurry. In addition, water may be additionally added to the mixed slurry to help increase the fluidity of the slurry.

The polycondensation reaction may be carried out, for example, by reacting the esterification reaction product at a temperature of 150° C. to 300° C. and under a reduced pressure condition of 0.01 mmHg to 600 mmHg for 1 hour to 24 hours. The polycondensation reaction may produce a relatively low molecular weight polyester resin through melt polymerization. In addition, a polyester resin having a relatively high molecular weight may be produced through solid-state polymerization after the melt polymerization.

The temperature in the polycondensation reaction may be 150° C. to 300° C., specifically, 200° C. to 290° C., more specifically, 260° C. to 280° C. In addition, the pressure in the polycondensation reaction may be 0.01 mmHg to 600 mmHg, specifically, 0.05 mmHg to 200 mmHg, more specifically, 0.1 mmHg to 100 mmHg. As the reduced pressure condition is adopted in the polycondensation reaction, glycol, which is a by-product of the polycondensation reaction, can be removed from the system. If the pressure in the polycondensation reaction exceeds the range of 0.01 mmHg to 400 mmHg, the removal of by-products may be insufficient. In addition, if the temperature in the polycondensation reaction is lower than 150° C., a glycol as a by-product of the reaction cannot be effectively removed from the system; thus, the intrinsic viscosity of a final reaction product is low, resulting in a decrease in the physical properties of the final polyester resin. If the temperature in the polycondensation reaction exceeds 300° C., the possibility of yellowing of a final polyester resin increases. In addition, the polycondensation reaction may be carried out for a necessary period of time, for example, an average residence time of 1 hour to 24 hours, until the intrinsic viscosity of a final reaction product reaches an appropriate level.

In addition, the polycondensation reaction may be carried out in the presence of a polycondensation catalyst. The polycondensation catalyst may be, for example, a titanium-based compound, a germanium-based compound, an antimony-based compound, an aluminum-based compound, a tin-based compound, or a mixture thereof. Examples of the titanium compound include tetraethyl titanate, acetyltripropyl titanate, tetrapropyl titanate, tetrabutyl titanate, 2-ethylhexyl titanate, octylene glycol titanate, lactate titanate, triethanolamine titanate, acetylacetonate titanate, ethylacetoacetic ester titanate, isostearyl titanate, titanium dioxide, and the like. Examples of the germanium-based compound include germanium dioxide, germanium tetrachloride, germanium ethylene glycol oxide, germanium acetate, or mixtures thereof. Preferably, germanium dioxide can be used. Both crystalline and amorphous germanium dioxide may be used, and glycol-soluble ones may also be used. The amount of the polycondensation catalyst used may be such that the amount of titanium element relative to the weight of the polyester resin is about 1 to 100 ppm, more preferably, about 1 to 50 ppm.

In addition to the polycondensation catalyst, a stabilizer, a colorant, a crystallizing agent, an antioxidant, a branching agent, or the like may be further used. The timing of adding these additives is not particularly limited, and they may be added at any time during the preparation step of the polyester resin.

As the stabilizer, phosphorus-based compounds such as phosphoric acid, trimethyl phosphate, triethyl phosphate, and triethyl phosphonoacetate may be generally used. The amount thereof added may be such that 10 to 200 ppm relative to the weight of the polyester resin based on the amount of phosphorus element. In addition, common colorants such as cobalt acetate and cobalt propionate may be exemplified as the colorant added to enhance the color of the polyester resin. The amount thereof added may be such that 10 to 200 ppm relative to the weight of the polyester resin based on the amount of cobalt element. If necessary, anthraquinone-based compounds, perinone-based compounds, azo-based compounds, methine-based compounds, or the like may be used as an organic colorant. Commercially available toners such as Polysynthren Blue RLS from Clarient or Solvaperm Red BB from Clarient may be used. The amount of the organic compound colorant added may be adjusted to 0 to 50 ppm based on the weight of the polyester resin. A crystal nucleating agent, an ultraviolet absorber, a polyolefin resin, a polyamide resin, and the like may be exemplified as the crystallizing agent. Hindered phenol-based antioxidants, phosphite-based antioxidants, thioether-based antioxidants, or mixtures thereof may be exemplified as the antioxidant. Conventional branching agents having three or more functional groups, for example, trimellitic anhydride, trimethylol propane, trimellitic acid, or mixtures thereof may be exemplified as the branching agent.

Process for Preparing Recycled BHET

Although bis(2-hydroxyethyl) terephthalate used in the preparation of the polyester resin according to the present invention is a recycled monomer obtained by the depolymerization of waste polyester, it has high purity and a low content of impurities such as diethylene glycol esters.

Such bis(2-hydroxyethyl) terephthalate can be obtained by carrying out the depolymerization reaction in multiple stages, while significantly lowering the temperature of the latter stage, followed by ion exchange and distillation of an unreacted glycol after the depolymerization reaction.

The process for preparing recycled bis(2-hydroxyethyl) terephthalate according to an embodiment may comprise (1) subjecting waste polyester to depolymerization by a first glycolysis reaction at a temperature of 180° C. to 200° C. to obtain a first reactant; (2) subjecting the first reactant to depolymerization by a second glycolysis reaction at a temperature of 150° C. to 170° C. to obtain a second reactant; (3) subjecting the second reactant to ion exchanging through an ion-exchange resin to obtain a third reactant; (4) removing an unreacted glycol from the third reactant through distillation at a temperature of 150° C. or lower to obtain a fourth reactant; and (5) subjecting the fourth reactant to distillation to obtain crude bis(2-hydroxyethyl) terephthalate.

According to the above process, bis(2-hydroxyethyl) terephthalate (BHET) can be produced with high purity by carrying out the depolymerization reaction in multiple stages, while significantly lowering the temperature of the latter stage, thereby reducing the formation of diethylene glycol and impurities derived therefrom. In addition, according to the above process, it is possible to prepare bis(2-hydroxyethyl) terephthalate (BHET) with enhanced quality in terms of color by further carrying out ion exchange and distillation of an unreacted glycol after the depolymerization reaction, thereby reducing the formation of oligomers and removing chromophores.

According to another embodiment, prior to step (1), a step of pulverizing the waste polyester to a size of a certain level or below may be further carried out. The waste polyester may have a particulate or fibrous form with a particle diameter of 4 mm or less. If the depolymerization is carried out as the particle diameter or diameter of waste polyester is adjusted within the specific range, solvation can be expedited even under the conditions of relatively low temperatures and short reaction time.

According to another embodiment, the first glycolysis reaction in step (1) is carried out in the presence of a catalyst. The catalyst comprises a metal acetate or an anhydride or a hydride thereof. More specifically, it may be at least one selected from the group consisting of zinc acetate, sodium acetate, cobalt acetate, and manganese acetate, or in the form of a hydrate or anhydride thereof. In addition, the catalyst may be used in an amount of 0.2 part by weight to 0.4 part by weight relative to 100 parts by weight of the waste polyester.

According to another embodiment, a step of cooling the second reactant obtained in step (2) to a certain temperature or lower may be further carried out.

According to another embodiment, prior to the ion exchange in step (3), a step of removing insoluble foreign substances from the second reactant through filtration may be further carried out. Specifically, a step of cooling the second reactant to 120° C. or lower and filtering it upon the addition of a filter aid may be further carried out.

According to another embodiment, prior to the ion exchange in step (3), a step of removing insoluble foreign substances from the second reactant through filtration may be further carried out.

According to another embodiment, the ion-exchange resin in step (3) is used in an amount of 1 part by weight to 20 parts by weight relative to 100 parts by weight of the waste polyester and comprises at least one selected from the group consisting of a strongly acidic cation-exchange resin, a weakly acidic cation-exchange resin, and a chelate resin.

According to another embodiment, the distillation to remove an unreacted glycol in step (4) may be carried out at a temperature of 100° C. to 130° C.

According to another embodiment, the distillation to obtain crude bis(2-hydroxyethyl) terephthalate in step (5) may be carried out by thin film evaporation under a pressure of 0.05 Torr to 0.4 Torr.

According to another embodiment, the process may further comprise, after the distillation in step (5), adsorbing-crystallizing the crude bis(2-hydroxyethyl) terephthalate. The adsorption-crystallization may be carried out by adding an adsorbent using water as a solvent, filtering, and crystallization.

According to a specific embodiment, first, waste polyester is pulverized to a size of 4 mm or less to be prepared, ethylene glycol is added thereto, which is then subjected to a first glycolysis reaction at a temperature of 180° C. to 200° C. in the presence of a zinc acetate catalyst for about 2 hours, and ethylene glycol is further added thereto, which is then subjected to a second glycolysis reaction at a temperature of 150° C. to 170° C. for about 2 hours. Thereafter, it is cooled to 120° C. or lower using a reduced pressure flash, a small amount of a filter aid is added thereto, which is then filtered to separate insoluble foreign substances through solid-liquid separation, and it is passed through a column filled with ion-exchange resin to carry out ion exchange. Then, unreacted glycol is recovered at a temperature of 100° C. to 130° C., purification is carried out by thin film distillation at 190° C. to 250° C., and, finally, an adsorption-crystallization step is carried out to obtain bis(2-hydroxyethyl) terephthalate with high purity and high quality.

According to the above process, a two-stage glycolysis reaction (i.e., a first glycolysis reaction and a second glycolysis reaction) is carried out. If the solvation is expedited in the first glycolysis reaction, the transesterification reaction of the waste polyester can be performed under the conditions of lower temperatures and short reaction time in the second glycolysis reaction. Thus, it is possible to significantly reduce the concentration of diethylene glycol (DEG) naturally formed at a common glycolysis reaction temperature and to significantly reduce the content of diethylene glycol esters in bis(2-hydroxyethyl) terephthalate finally prepared.

Articles Using the Polyester Resin

The polyester resin according to the present invention can be used as a material for beverage-filling containers, packaging films, audio and video films, and the like by virtue of its excellent mechanical strength, thermal resistance, transparency, and gas barrier properties.

In addition, polyester sheets or plates prepared from the polyester resin according to the present invention have good transparency and excellent mechanical strength, so that they can be used as raw materials for cases, boxes, partitions, shelves, panels, packaging materials, building materials, interior and exterior materials, and the like.

In addition, the polyester resin according to the present invention can be used as an industrial material such as medical fibers and tire cords.

Accordingly, the present invention also provides an article, which comprises the polyester resin. For example, the article may be a film, a sheet, or a profile. Specific examples of the film include a heat shrinkable film and a blown film. The profile refers to a continuously extrusion-molded article of plastics excluding sheets and films. It may be manufactured by a general extrusion molding method and may have, for example, a tube or channel shape.

Specifically, a polyester film prepared from the polyester resin of the present invention may have a haze of 5% or less, 4% or less, 3% or less, 2.5% or less, 2% or less, or 1% or less, based on a film thickness of 50 μm, as measured according to ASTM D1003-97, thereby exhibiting high transparency. Since haze is most preferably 0%, theoretically, the lower limit may be 0% or more.

In particular, as the polyester film according to the present invention is prepared from a polyester resin in which the content of diethylene glycol derivatives formed from r-BHET is controlled, it has excellent thermal resistance, thereby exhibiting uniform heat shrinkage characteristics, and is optically transparent, making it useful as a heat shrinkable label for PET containers. Accordingly, the present invention provides a heat shrinkable polyester film, which comprises the polyester resin.

The polyester film of the present invention exhibits a low heat shrinkage rate at a low temperature while it exhibits a high heat shrinkage rate at a high temperature for a heat shrinkage process, so that it is suitable as a heat shrinkable label.

For example, the polyester film may have a sum of a heat shrinkage rate (%) in the transverse direction (TD) and a heat expansion rate (%) in the longitudinal direction (MD) of 65% or less at 70° C. Specifically, the heat shrinkage rate may be measured by immersing it in hot water at 70° C. for 10 seconds. The sum of the TD heat shrinkage rate and the MD heat expansion rate, under the test conditions, may be 65% or less, 60% or less, 50% or less, 40% or less, 30% or less, or 20% or less. Meanwhile, the lower limit of the sum of the TD heat shrinkage rate and the MD heat expansion rate at 70° C. is not particularly limited, but it may be, for example, 0% or more, 10% or more, or 15% or more.

In addition, the polyester film exhibits a maximum shrinkage rate of 55% or more, 60% or more, 65% or more, 70% or more, or 75% or more at 95° C., whereby it is possible to provide a heat shrinkable film of excellent quality. The upper limit of the maximum shrinkage rate is not particularly limited, and it may be, for example, 85% or less.

The polyester film may be a single-layer film or a multilayer film including two or more layers.

The process for preparing the polyester film comprises molding a polyester resin composition to prepare an unstretched film; and stretching the unstretched film.

The polyester resin composition may be provided in the form of chips or pellets as a polyester resin is mixed with additives suitable for use. Specifically, the polyester resin composition may be molded in the form of chips or pellets through a twin-screw extruder.

Thereafter, the polyester resin composition thus prepared is molded to prepare an unstretched film. The polyester resin composition may be molded at a temperature of about 180° C. to 310° C., about 200° C. to 310° C., about 230° C. to 310° C., about 240° C. to 300° C., or about 250° C. to 290° C., in order to minimize the thermal decomposition of the polymer to maintain the long-chain structure of the polymer and to minimize the problem of damage or breakage of the film in the subsequent process such as the stretching step.

Specifically, the polyester resin composition in the form of chips or pellets is supplied to an extruder, and the temperature of the cylinder is adjusted to the above range, to obtain an unstretched film.

If the polyester film has a multilayer structure, two or more layers may be formed sequentially or simultaneously. That is, each layer may be sequentially formed in a way in which one layer is formed, and another layer is then formed on the layer. Alternatively, two or more layers may be formed at once by a method such as co-extrusion.

The unstretched film obtained by the above method may be cooled to an appropriate temperature. Although not particularly limited, the prepared unstretched film is cast onto a roll at about 10° C. to 70° C. or 20° C. to 70° C. and then may be supplied to the next step.

In the step of stretching the unstretched film, the unstretched film is stretched in the longitudinal direction and/or the transverse direction to provide a uniaxially stretched film or a biaxially stretched film.

The stretching temperature of the unstretched film may be a temperature equal to, or higher than, the glass transition temperature of the polyester resin. Specifically, the unstretched film may be stretched at a temperature of 55° C. to 180° C. or 60° C. to 170° C.

The unstretched film may be stretched at a high stretching ratio. As an example, the unstretched film may be uniaxially stretched at a stretching ratio of 1.5 to 6 times in the transverse direction or a stretching ratio of 1.1 to 5 times in the longitudinal direction. In addition, as another example, the unstretched film may be biaxially stretched at a stretching ratio of 1.5 to 6 times in the transverse direction and a stretching ratio of 1.1 to 5 times in the longitudinal direction.

The polyester film may have a thickness of 3 µm or more, 5 µm or more, 10 µm or more, 30 µm or more, 50 µm or more, or 100 µm or more, and may be 500 µm or less, 350 µm or less, 200 µm or less, or 150 µm or less. As a specific example, the polyester film may have a thickness of 3 µm to 350 rim.

MODE FOR THE INVENTION

Hereinafter, the present invention will be described in more detail with reference to embodiments. However, these examples are provided only for illustration purposes, and the present invention is not limited thereto.

Preparation Example: r-BHET_A1 (recycled BHET)

A first reactor made of stainless steel (SUS) was charged with 1,000 g of a waste polyester resin pulverized to a particle size of 4 mm or less, 2,000 g of ethylene glycol, and 3.5 g of zinc acetate anhydride. The temperature inside the reactor was raised to 180° C., and depolymerization (first glycolysis reaction) was carried out for 2 hours. The reactant (first reactant) thus obtained was transferred to a second reactor and cooled to 150° C. 2,000 g of ethylene glycol was further added thereto, and depolymerization (second glycolysis reaction) was carried out for 2 hours while the reactor temperature was maintained at 150° C. The reactant (second reactant) thus obtained was cooled to 120° C. through reduced pressure flash, and 16 g of a filter aid was added thereto, followed by pressurized filtration to carry out solid-liquid separation. The separated liquid reactant was passed through a column filled with an ion-exchange resin (BC107 (H) of Bonlite) to remove ionic impurities to obtain a mixture (third reactant) containing bis(2-hydroxyethyl) terephthalate and ethylene glycol. The mixture (third reactant) was transferred to a 10-liter distillation apparatus, and vacuum distillation was carried out at 130° C. to recover unreacted ethylene glycol. The reactant (fourth reactant) from which ethylene glycol had been removed was subjected to thin film evaporation at 220° C. and 0.08 Ton in a thin film evaporator (VKL70-4S of VTA) to obtain 1,040 g of a product from which dimers or higher oligomers had been removed. Thereafter, for adsorption-crystallization, 1,040 g of the above product and 3,120 g of distilled water were charged to a 20-liter glass reactor, dissolved at a temperature of 70° C., and then 5.2 g of activated carbon was added thereto, followed by stirring for 30 minutes and filtration thereof. The filtrate was cooled to room temperature for the crystallization thereof, filtered, and dried in a vacuum oven. As a result, 990 g of a final product containing bis(2-hydroxyethyl) terephthalate was obtained.

Preparation Example: r-BHET_A2 (recycled BHET)

980 g of a final product containing bis(2-hydroxyethyl) terephthalate (referred to as r-BHET_A2) was obtained through the same procedure as in the Preparation Example of r-BHET_A1, except that the first glycolysis reaction was carried out at 180° C. for 1 hour.

Preparation Example: r-BHET_A3 (recycled BHET)

985 g of a final product containing bis(2-hydroxyethyl) terephthalate (referred to as r-BHET_A3) was obtained through the same procedure as in the Preparation Example of r-BHET_A1, except that 1,000 g of a waste fiber was used as a raw material for waste polyester.

Preparation Example: r-BHET_A4 (recycled BHET)

992 g of a final product containing bis(2-hydroxyethyl) terephthalate (referred to as r-BHET_A4) was obtained through the same procedure as in the Preparation Example of r-BHET_A1, except that 1,000 g of a waste banner was used as a raw material for waste polyester.

Preparation Example: r-BHET_A5 (recycled BHET)

1,050 g of a final product containing bis(2-hydroxyethyl) terephthalate (referred to as r-BHET_A5) was obtained through the same procedure as in the Preparation Example of r-BHET_A1, except that no adsorption-crystallization step was carried out after the thin film evaporation.

Preparation Example: r-BHET_B1 (recycled BHET)

A reactor made of stainless steel (SUS) was charged with 1,000 g of a waste polyester resin having a particle size of 4 mm or less, 4,000 g of ethylene glycol, and 3.5 g of zinc acetate anhydride. The temperature inside the reactor was raised to 196° C., and depolymerization (glycolysis reaction) was carried out for 4 hours. The reactant thus obtained was cooled to 30° C., and crystallization of bis(2-hydroxyethyl) terephthalate was carried out for 2 hours. The slurry of bis(2-hydroxyethyl) terephthalate and ethylene glycol thus obtained was subjected to solid-liquid separation in a centrifugal separator. Bis(2-hydroxyethyl) terephthalate obtained through centrifugation was washed twice with a sufficient amount of distilled water, and the residual solvent was removed in an oven to obtain about 1,010 g of a final product containing bis(2-hydroxyethyl) terephthalate (referred to as r-BHET_B1).

Preparation Example: r-BHET_B2 (recycled BHET)

About 1,000 g of a final product containing bis(2-hydroxyethyl) terephthalate (referred to as r-BHET_B2) was obtained through the same procedure as in the Preparation Example of r-BHET_B1, except that the glycolysis reaction was carried out at 210° C.

Preparation Example: r-BHET_B3 (recycled BHET)

About 1,020 g of a final product containing bis(2-hydroxyethyl) terephthalate (referred to as r-BHET_B3) was obtained through the same procedure as in the Preparation Example of r-BHET_A1, except that the first glycolysis reaction was carried out at 196° C. for 4 hours and that neither the second glycolysis reaction nor the adsorption-crystallization was carried out.

Evaluation of recycled bis(2-hydroxyethyl) terephthalate

The resultants containing each recycled bis(2-hydroxyethyl) terephthalate) prepared above were tested as follows. The results are summarized in Table 1 below.

(1) Composition-High-performance liquid chromatography (HPLC)

About 0.01 g of a sample was diluted in about 20 ml of methanol and then measured by HPLC.
  Model: Waters e2695
  Column: C18 (4.6×250 mm), 5 μm
  UV detector: 242 nm
  Injection volume: 10 μl
  Eluent (gradient) A: $H_2O+H_3PO_4$, B: acetonitrile (2) Residual solvent-Gas chromatography (GC)

About 0.1 g of a sample was diluted in about 10 ml of $CHCl_3$, treated with a filter of 0.45 μm, and then measured by GC.
  Model: Agilent 7890B
  Column: DB-624 (30 m×0.25 mm×1.4 μm)
  Oven Temp.: 60° C. (2 min)-10° C./min-200° C. (0 min)-20° C./min-260° C. (5 5 min)
  Injector temp.: 250° C.
  Detector temp.: 250° C.
  Flow: 1.5 ml/min ($N_2$), split ratio: 1/50

TABLE 1

| | | r-BHET | | | | | | | |
|---|---|---|---|---|---|---|---|---|---|
| | | A1 | A2 | A3 | A4 | A5 | B1 | B2 | B3 |
| HPLC (Area %) | BHET | 98.21 | 98.2 | 97.84 | 96.58 | 96.76 | 82.55 | 84.58 | 90.68 |
| | MHET | 1.09 | 1.08 | 1.1 | 1.72 | 1.89 | 1 | 2.18 | 1.66 |
| | DEG ester 1* | 0.44 | 0.43 | 0.62 | 0.61 | 0.8 | 3.67 | 5.35 | 2.88 |
| | DEG ester 2* | 0 | 0 | 0.16 | 0.09 | 0.1 | 0.38 | 0.27 | 0.25 |
| | Dimer | 0.2 | 0.19 | 0.22 | 0.84 | 0.23 | 10.44 | 6.36 | 3.68 |
| | Trimer | 0 | 0 | 0 | 0 | 0 | 0.89 | 0.72 | 0.35 |
| | Others | 0.06 | 0.1 | 0.06 | 0.16 | 0.22 | 1.07 | 0.54 | 0.5 |
| GC | Residual EG (wt %) | 0.07 | 0.07 | 0.08 | 0.07 | 0.23 | 0.41 | 0.45 | 0.33 |

*BHET: bis(2-hydroxyethyl) terephthalate,
*MHET: mono(2-hydroxyethyl) terephthalic acid
*DEG ester 1: 2-hydroxyethyl[2-(2-hydroxyethoxy)ethyl] terephthalate
*DEG ester 2: bis[2-(2-hydroxyethoxy)ethyl]benzene-1,4-dicarboxylate As can be seen from the above table, in r-BHET_A1 to r-BHET_A5, the ratio of BHET was high, no inorganic impurities were observed, and the content of DEG-derived esters was very low. In contrast, r-BHET_B1 to r-BHET_B3 each had problems in that they contained a large amount of dimers or DEG-derived esters, or had some residual solvents (EG).

Example 1: Preparation of a Polyester Resin

A 10-liter reactor equipped with a column and a condenser that can be cooled by water was charged with recycled bis(2-hydroxyethyl) terephthalate (r-BHET_A1, 2,863.5 g), terephthalic acid (TPA, 1,871.4 g), ethylene glycol (EG, 97.9 g), 1,4-cyclohexanedimethanol (CHDM, 1,039.0 g), and diethylene glycol (DEG, 32.9 g), followed by the addition thereto of a Ti catalyst (0.2 g), phosphoric acid (10.0 g), a blue toner (0.005 g), and a red toner (0.003 g).

Subsequently, nitrogen was injected into the reactor to make the reactor pressurized by 1.0 kgf/cm² higher than normal pressure (absolute pressure: 1,495.6 mmHg). Then, the temperature of the reactor was raised to 220° C. over 90 minutes and maintained at 220° C. for 2 hours, and the temperature was then raised again to 260° C. over 2 hours. Thereafter, an esterification reaction was carried out at a temperature of 260° C. while the mixture in the reactor was visually observed until the mixture became transparent. In this procedure, by-products were discharged through the column and condenser. Upon completion of the esterification reaction, nitrogen in the pressurized reactor was released to the outside to lower the pressure in the reactor to normal pressure, and the mixture in the reactor was then transferred to a 7-liter reactor capable of a reaction under vacuum.

Then, the pressure of the reactor was reduced from normal pressure to 5 Torr (absolute pressure: 5 mmHg) over 30 minutes. At the same time, the temperature of the reactor was raised to 270° C. over 1 hour, and a polycondensation reaction was carried out while the pressure of the reactor was maintained at 1 Torr (absolute pressure: 1 mmHg) or less. At the beginning of the polycondensation reaction, the stirring speed may be set high. As the polycondensation reaction proceeds, when the stirring power is weakened due to the increase in the viscosity of the reactants or the temperature of the reactants rises above the set temperature, the stirring speed may be appropriately adjusted accordingly. The polycondensation reaction was carried out until the intrinsic viscosity (IV) of the mixture (melt) in the reactor reached 0.80 dl/g. When the intrinsic viscosity of the mixture in the reactor reached the desired level, the mixture was then discharged to the outside of the reactor to form strands, which were solidified with a cooling liquid and then granulated to have an average weight of about 12 to 14 mg to prepare about 5 kg of a polyester resin (copolymer).

Example 2: Preparation of a Polyester Resin

A 10-liter reactor equipped with a column and a condenser that can be cooled by water was charged with recycled bis(2-hydroxyethyl) terephthalate (r-BHET_A2, 5,968.0 g), CHDM (676.7 g), and DEG (68.6 g), followed by the addition thereto of a Ge catalyst (3.2 g), a blue toner (0.015 g), and a red toner (0.008 g).

Subsequently, nitrogen was injected into the reactor to make the reactor pressurized by 2.0 kgf/cm² higher than normal pressure (absolute pressure: 2,231.1 mmHg). Then, the temperature of the reactor was raised to 220° C. over 90 minutes and maintained at 220° C. for 2 hours, and the temperature was then raised again to 260° C. over 2 hours. Thereafter, an esterification reaction was carried out at a temperature of 260° C. while the mixture in the reactor was visually observed until the mixture became transparent. In this procedure, by-products were discharged through the column and condenser. Upon completion of the esterification reaction, nitrogen in the pressurized reactor was released to the outside to lower the pressure in the reactor to normal pressure, and the mixture in the reactor was then transferred to a 7-liter reactor capable of a reaction under vacuum.

Then, the pressure of the reactor was reduced from normal pressure to 5 Ton (absolute pressure: 5 mmHg) over 30 minutes. At the same time, the temperature of the reactor was raised to 275° C. over 1 hour, and a polycondensation reaction was carried out while the pressure of the reactor was maintained at 1 Torr (absolute pressure: 1 mmHg) or less. At the beginning of the polycondensation reaction, the stirring speed may be set high. As the polycondensation reaction proceeds, when the stirring power is weakened due to the increase in the viscosity of the reactants or the temperature of the reactants rises above the set temperature, the stirring speed may be appropriately adjusted accordingly. The polycondensation reaction was carried out until the intrinsic viscosity (IV) of the mixture (melt) in the reactor reached 0.65 dl/g. When the intrinsic viscosity of the mixture in the reactor reached the desired level, the mixture was then discharged to the outside of the reactor to form strands, which were solidified with a cooling liquid and then granulated to have an average weight of about 12 to 14 mg to prepare about 5 kg of a polyester resin (copolymer).

Example 3: Preparation of a Polyester Resin

A 10-liter reactor equipped with a column and a condenser that can be cooled by water was charged with recycled bis(2-hydroxyethyl) terephthalate (r-BHET_A3, 4,236.4 g), TPA (1,186.6 g), EG (88.6 g), CHDM (480.3 g), DEG (173.9 g), and a CHDM derivative (173.9 g, comprising 4-(hydroxymethyl)cyclohexylmethyl-4-(hydroxymethyl)cyclohexanecarboxylate and 4-(4-(hydroxymethyl)cyclohexylmethoxymethyl)cyclohexylmethanol at a molar ratio of 1:3), followed by the addition thereto of a Ge catalyst (3.2 g), a Ti catalyst (0.3 g), a blue toner (0.020 g), and a red toner (0.005 g).

Subsequently, nitrogen was injected into the reactor to make the reactor pressurized by 0.5 kgf/cm$^2$ higher than normal pressure (absolute pressure: 1,127.8 mmHg). Then, the temperature of the reactor was raised to 220° C. over 90 minutes and maintained at 220° C. for 2 hours, and the temperature was then raised again to 260° C. over 2 hours. Thereafter, an esterification reaction was carried out at a temperature of 260° C. while the mixture in the reactor was visually observed until the mixture became transparent. In this procedure, by-products were discharged through the column and condenser. Upon completion of the esterification reaction, nitrogen in the pressurized reactor was released to the outside to lower the pressure in the reactor to normal pressure, and the mixture in the reactor was then transferred to a 7-liter reactor capable of a reaction under vacuum.

Then, the pressure of the reactor was reduced from normal pressure to 5 Torr (absolute pressure: 5 mmHg) over 30 minutes. At the same time, the temperature of the reactor was raised to 275° C. over 1 hour, and a polycondensation reaction was carried out while the pressure of the reactor was maintained at 1 Torr (absolute pressure: 1 mmHg) or less. At the beginning of the polycondensation reaction, the stirring speed may be set high. As the polycondensation reaction proceeds, when the stirring power is weakened due to the increase in the viscosity of the reactants or the temperature of the reactants rises above the set temperature, the stirring speed may be appropriately adjusted accordingly. The polycondensation reaction was carried out until the intrinsic viscosity (IV) of the mixture (melt) in the reactor reached 0.75 dl/g. When the intrinsic viscosity of the mixture in the reactor reached the desired level, the mixture was then discharged to the outside of the reactor to form strands, which were solidified with a cooling liquid and then granulated to have an average weight of about 12 to 14 mg to prepare about 5 kg of a polyester resin (copolymer).

Example 4: Preparation of a polyester resin

A 10-liter reactor equipped with a column and a condenser that can be cooled by water was charged with recycled bis(2-hydroxyethyl) terephthalate (r-BHET_A4, 1,182.1 g), TPA (3,090.1 g), EG (692.5 g), CHDM (737.2 g), and DEG (169.9 g), followed by the addition thereto of a Ti catalyst (0.2 g), a blue toner (0.008 g), and a red toner (0.003 g).

Subsequently, nitrogen was injected into the reactor to make the reactor pressurized by 1.0 kgf/cm$^2$ higher than normal pressure (absolute pressure: 1,495.6 mmHg). Then, the temperature of the reactor was raised to 220° C. over 90 minutes and maintained at 220° C. for 2 hours, and the temperature was then raised again to 250° C. over 2 hours. Thereafter, an esterification reaction was carried out at a temperature of 250° C. while the mixture in the reactor was visually observed until the mixture became transparent. In this procedure, by-products were discharged through the column and condenser. Upon completion of the esterification reaction, nitrogen in the pressurized reactor was released to the outside to lower the pressure in the reactor to normal pressure, and the mixture in the reactor was then transferred to a 7-liter reactor capable of a reaction under vacuum.

Then, the pressure of the reactor was reduced from normal pressure to 5 Torr (absolute pressure: 5 mmHg) over 30 minutes. At the same time, the temperature of the reactor was raised to 280° C. over 1 hour, and a polycondensation reaction was carried out while the pressure of the reactor was maintained at 1 Torr (absolute pressure: 1 mmHg) or less. At the beginning of the polycondensation reaction, the stirring speed may be set high. As the polycondensation reaction proceeds, when the stirring power is weakened due to the increase in the viscosity of the reactants or the temperature of the reactants rises above the set temperature, the stirring speed may be appropriately adjusted accordingly. The polycondensation reaction was carried out until the intrinsic viscosity (IV) of the mixture (melt) in the reactor reached 0.82 dl/g. When the intrinsic viscosity of the mixture in the reactor reached the desired level, the mixture was then discharged to the outside of the reactor to form strands, which were solidified with a cooling liquid and then granulated to have an average weight of about 12 to 14 mg to prepare about 5 kg of a polyester resin (copolymer).

Example 5: Preparation of a Polyester Resin

A 10-liter reactor equipped with a column and a condenser that can be cooled by water was charged with recycled bis(2-hydroxyethyl) terephthalate (r-BHET_A5, 2,426.2 g), TPA (2,378.4 g), EG (992.0 g), CHDM (687.7 g), and a CHDM derivative (173.9 g, comprising 4-(hydroxymethyl)cyclohexylmethyl-4-(hydroxymethyl)cyclohexanecarboxylate and 4-(4-(hydroxymethyl)cyclohexylmethoxymethyl)cyclohexylmethanol at a molar ratio of 1:3), followed by the addition thereto of a Ge catalyst (6.4 g), a Ti catalyst (0.4 g), a blue toner (0.003 g), and a red toner (0.001 g).

Subsequently, nitrogen was injected into the reactor to make the reactor pressurized by 2.0 kgf/cm$^2$ higher than normal pressure (absolute pressure: 2,231.1 mmHg). Then, the temperature of the reactor was raised to 220° C. over 90 minutes and maintained at 220° C. for 2 hours, and the temperature was then raised again to 255° C. over 2 hours. Thereafter, an esterification reaction was carried out at a temperature of 255° C. while the mixture in the reactor was visually observed until the mixture became transparent. In this procedure, by-products were discharged through the column and condenser. Upon completion of the esterification reaction, nitrogen in the pressurized reactor was released to the outside to lower the pressure in the reactor to normal pressure, and the mixture in the reactor was then transferred to a 7-liter reactor capable of a reaction under vacuum.

Then, the pressure of the reactor was reduced from normal pressure to 5 Torr (absolute pressure: 5 mmHg) over 30 minutes. At the same time, the temperature of the reactor was raised to 285° C. over 1 hour, and a polycondensation reaction was carried out while the pressure of the reactor was maintained at 1 Torr (absolute pressure: 1 mmHg) or less. At the beginning of the polycondensation reaction, the stirring speed may be set high. As the polycondensation reaction proceeds, when the stirring power is weakened due to the increase in the viscosity of the reactants or the temperature of the reactants rises above the set temperature, the stirring speed may be appropriately adjusted accordingly. The polycondensation reaction was carried out until the intrinsic viscosity (IV) of the mixture (melt) in the reactor reached 0.78 dl/g. When the intrinsic viscosity of the mixture in the reactor reached the desired level, the mixture was then discharged to the outside of the reactor to form strands, which were solidified with a cooling liquid and then granulated to have an average weight of about 12 to 14 mg to prepare about 5 kg of a polyester resin (copolymer).

Example 6: Preparation of a Polyester Resin

A 10-liter reactor equipped with a column and a condenser that can be cooled by water was charged with recycled bis(2-hydroxyethyl) terephthalate (r-BHET_A2, 4,186.3 g), terephthalic acid (TPA, 1,172.5 g), isophthalic acid (IPA, 2,735.9 g), 1,4-cyclohexanedimethanol (CHDM, 678.1 g), and diethylene glycol (DEG, 171.9 g), followed by the addition thereto of a Ti catalyst (0.4 g), phosphoric acid (1.0 g), a blue toner (0.010 g), and a red toner (0.005 g).

Subsequently, nitrogen was injected into the reactor to make the reactor pressurized by 3.0 kgf/cm$^2$ higher than normal pressure (absolute pressure: 2,966.7 mmHg). Then, the temperature of the reactor was raised to 220° C. over 90 minutes and maintained at 220° C. for 2 hours, and the temperature was then raised again to 260° C. over 2 hours. Thereafter, an esterification reaction was carried out at a temperature of 260° C. while the mixture in the reactor was visually observed until the mixture became transparent. In this procedure, by-products were discharged through the column and condenser. Upon completion of the esterification reaction, nitrogen in the pressurized reactor was released to the outside to lower the pressure in the reactor to normal pressure, and the mixture in the reactor was then transferred to a 7-liter reactor capable of a reaction under vacuum.

Then, the pressure of the reactor was reduced from normal pressure to 5 Torr (absolute pressure: 5 mmHg) over 30 minutes. At the same time, the temperature of the reactor was raised to 275° C. over 1 hour, and a polycondensation reaction was carried out while the pressure of the reactor was maintained at 1 Torr (absolute pressure: 1 mmHg) or less. At the beginning of the polycondensation reaction, the stirring speed may be set high. As the polycondensation reaction proceeds, when the stirring power is weakened due to the increase in the viscosity of the reactants or the temperature of the reactants rises above the set temperature, the stirring speed may be appropriately adjusted accordingly. The polycondensation reaction was carried out until the intrinsic viscosity (IV) of the mixture (melt) in the reactor reached 0.65 dl/g. When the intrinsic viscosity of the mixture in the reactor reached the desired level, the mixture was then discharged to the outside of the reactor to form strands, which were solidified with a cooling liquid and then granulated to have an average weight of about 12 to 14 mg to prepare about 5 kg of a polyester resin (copolymer).

Comparative Example 1: Preparation of a Polyester Resin

A 10-liter reactor equipped with a column and a condenser that can be cooled by water was charged with recycled bis(2-hydroxyethyl) terephthalate (r-BHET_B1, 2,863.5 g), TPA (1,871.4 g), EG (251.6 g), and CHDM (1,039.0 g), followed by the addition thereto of a Ge catalyst (6.4 g), a blue toner (0.010 g), and a red toner (0.005 20 g).

Subsequently, nitrogen was injected into the reactor to make the reactor pressurized by 0.5 kgf/cm$^2$ higher than normal pressure (absolute pressure: 1,127.8 mmHg). Then, the temperature of the reactor was raised to 220° C. over 90 minutes and maintained at 220° C. for 2 hours, and the temperature was then raised again to 260° C. over 2 hours. Thereafter, an esterification reaction was carried out at a temperature of 260° C. while the mixture in the reactor was visually observed until the mixture became transparent. In this procedure, by-products were discharged through the column and condenser. Upon completion of the esterification reaction, nitrogen in the pressurized reactor was released to the outside to lower the pressure in the reactor to normal pressure, and the mixture in the reactor was then transferred to a 7-liter reactor capable of a reaction under vacuum.

Then, the pressure of the reactor was reduced from normal pressure to 5 Torr (absolute pressure: 5 mmHg) over 30 minutes. At the same time, the temperature of the reactor was raised to 280° C. over 1 hour, and a polycondensation reaction was carried out while the pressure of the reactor was maintained at 1 Torr (absolute pressure: 1 mmHg) or less. At the beginning of the polycondensation reaction, the stirring speed may be set high. As the polycondensation reaction proceeds, when the stirring power is weakened due to the increase in the viscosity of the reactants or the temperature of the reactants rises above the set temperature, the stirring speed may be appropriately adjusted accordingly. The polycondensation reaction was carried out until the intrinsic viscosity (IV) of the mixture (melt) in the reactor reached 0.50 dl/g. When the intrinsic viscosity of the mixture in the reactor reached the desired level, the mixture was then discharged to the outside of the reactor to form strands, which were solidified with a cooling liquid and then granulated to have an average weight of about 12 to 14 mg to prepare about 5 kg of a polyester resin (copolymer).

Comparative Example 2: Preparation of a Polyester Resin

A 10-liter reactor equipped with a column and a condenser that can be cooled by water was charged with recycled bis(2-hydroxyethyl) terephthalate (r-BHET_B3, 4,737.9 g), TPA (774.1 g), EG (968.6 g), CHDM (738.7 g), and DEG (34.0 g), followed by the addition thereto of a Ti catalyst (0.2 g), a blue toner (0.008 g), and a red toner (0.003 g).

Subsequently, nitrogen was injected into the reactor to make the reactor pressurized by 1.0 kgf/cm$^2$ higher than normal pressure (absolute pressure: 1,495.6 mmHg). Then, the temperature of the reactor was raised to 220° C. over 90 minutes and maintained at 220° C. for 2 hours, and the temperature was then raised again to 265° C. over 2 hours. Thereafter, an esterification reaction was carried out at a temperature of 265° C. while the mixture in the reactor was visually observed until the mixture became transparent. In this procedure, by-products were discharged through the column and condenser. Upon completion of the esterification reaction, nitrogen in the pressurized reactor was released to the outside to lower the pressure in the reactor to normal pressure, and the mixture in the reactor was then transferred to a 7-liter reactor capable of a reaction under vacuum.

Then, the pressure of the reactor was reduced from normal pressure to 5 Torr (absolute pressure: 5 mmHg) over 30 minutes. At the same time, the temperature of the reactor was raised to 270° C. over 1 hour, and a polycondensation reaction was carried out while the pressure of the reactor was maintained at 1 Torr (absolute pressure: 1 mmHg) or less. At the beginning of the polycondensation reaction, the stirring speed may be set high. As the polycondensation reaction proceeds, when the stirring power is weakened due to the increase in the viscosity of the reactants or the temperature of the reactants rises above the set temperature, the stirring speed may be appropriately adjusted accordingly. The polycondensation reaction was carried out until the intrinsic viscosity (IV) of the mixture (melt) in the reactor reached 0.70 dl/g. When the intrinsic viscosity of the mixture in the reactor reached the desired level, the mixture was then discharged to the outside of the reactor to form strands, which were solidified with a cooling liquid and then granulated to have an average weight of about 12 to 14 mg to prepare about 5 kg of a polyester resin (copolymer).

Comparative Example 3: Preparation of a polyester resin

A 10-liter reactor equipped with a column and a condenser that can be cooled by water was charged with recycled bis(2-hydroxyethyl) terephthalate (r-BHET_B2, 3,036.2 g), TPA (1,984.3 g), EG (652.2 g), CHDM (516.4 g), and DEG (34.9 g), followed by the addition thereto of a Ge catalyst (3.2 g), a Ti catalyst (0.4 g), phosphoric acid (1.0 g), a blue toner (0.015 g), and a red toner (0.005 g).

Subsequently, nitrogen was injected into the reactor to make the reactor pressurized by 0.5 kgf/cm$^2$ higher than normal pressure (absolute pressure: 1,127.8 mmHg). Then, the temperature of the reactor was raised to 220° C. over 90 minutes and maintained at 220° C. for 2 hours, and the temperature was then raised again to 255° C. over 2 hours. Thereafter, an esterification reaction was carried out at a temperature of 255° C. while the mixture in the reactor was visually observed until the mixture became transparent. In this procedure, by-products were discharged through the column and condenser. Upon completion of the esterification reaction, nitrogen in the pressurized reactor was released to the outside to lower the pressure in the reactor to normal pressure, and the mixture in the reactor was then transferred to a 7-liter reactor capable of a reaction under vacuum.

Then, the pressure of the reactor was reduced from normal pressure to 5 Torr (absolute pressure: 5 mmHg) over 30 minutes. At the same time, the temperature of the reactor was raised to 270° C. over 1 hour, and a polycondensation reaction was carried out while the pressure of the reactor was maintained at 1 Torr (absolute pressure: 1 mmHg) or less. At the beginning of the polycondensation reaction, the stirring speed may be set high. As the polycondensation reaction proceeds, when the stirring power is weakened due to the increase in the viscosity of the reactants or the temperature of the reactants rises above the set temperature, the stirring speed may be appropriately adjusted accordingly. The polycondensation reaction was carried out until the intrinsic viscosity (IV) of the mixture (melt) in the reactor reached 0.60 dl/g. When the intrinsic viscosity of the mixture in the reactor reached the desired level, the mixture was then discharged to the outside of the reactor to form strands, which were solidified with a cooling liquid and then granulated to have an average weight of about 12 to 14 mg to prepare about 5 kg of a polyester resin (copolymer).

In addition, the glycol/diacid molar ratio of the polyester resin prepared in each of the Examples and Comparative Examples was calculated. In addition, the content (% by weight) of r-BHET in the polyester resin was calculated. The results are shown in Tables 2 and 3.

TABLE 2

|  |  | Ex. 1 | Ex. 2 | Ex. 3 | Ex. 4 | Ex. 5 | Ex. 6 |
| --- | --- | --- | --- | --- | --- | --- | --- |
| Main monomer | r-BHET | A1 | A2 | A3 | A4 | A5 | A2 |
| Amount of | r-BHET | 2,863.5 | 5,968.0 | 4,236.4 | 1,182.1 | 2,426.2 | 4,186.3 |
| monomers | TPA | 1,871.4 | 0.0 | 1,186.6 | 3,090.1 | 2,378.4 | 1,172.5 |
| added (g) | IPA | — | — | — | — | — | 2,735.9 |
|  | EG | 97.9 | 0.0 | 88.6 | 692.5 | 992.0 | 0.0 |
|  | CHDM | 1,039.0 | 676.7 | 480.3 | 737.2 | 687.7 | 678.1 |
|  | DEG | 32.9 | 68.6 | 173.9 | 169.9 | 0.0 | 171.9 |
|  | CHDM derivative | 0.0 | 0.0 | 173.9 | 0.0 | 104.6 | 0.0 |
| Glycol/diacid molar ratio |  | 1.4 | 2.22 | 1.7 | 1.15 | 1.7 | 1.65 |
| r-BHET content (wt %) |  | 47 | 84 | 65 | 22 | 37 | 65 |

TABLE 3

|  |  | C. Ex. 1 | C. Ex. 2 | C. Ex. 3 |
|---|---|---|---|---|
| Main monomer | r-BHET | B1 | B3 | B2 |
| Amount of monomers added (g) | r-BHET | 2,863.5 | 4,737.9 | 3,036.2 |
|  | TPA | 1,871.4 | 774.1 | 1,984.3 |
|  | IPA | — | — | — |
|  | EG | 251.6 | 968.6 | 652.2 |
|  | CHDM | 1,039.0 | 738.7 | 516.4 |
|  | DEG | 0.0 | 34.0 | 34.9 |
|  | CHDM derivative | 0.0 | 0.0 | 0.0 |
| Glycol/diacid molar ratio |  | 1.5 | 2.50 | 1.60 |
| r-BHET content (wt %) |  | 45 | 65 | 48 |

Test Example 1: First thermal resistance index

The first thermal resistance index of the following Equation (1) was calculated for the polyester resins.

$$\text{First thermal resistance index} = \frac{(DEG_1 + 2 \times DEG_2) \times rBHET}{BHET_0} \quad (1)$$

In Equation (1), $DEG_1$, $DEG_2$, and $BHET\ 0$ are each the peak area fraction (%) of 2-hydroxyethyl[2-(2-hydroxyethoxy)ethyl] terephthalate, bis[2-(2-hydroxyethoxy)ethyl] benzene-1,4-dicarboxylate, and bis(2-hydroxyethyl) terephthalate, when the recycled bis(2-hydroxyethyl) terephthalate is measured by high-performance liquid chromatography (HPLC), and rBHET is the weight fraction (%) of recycled bis(2-hydroxyethyl) terephthalate in the polyester resin. Only numerical values of these parameters ($DEG_1$, $DEG_2$, $BHET_0$, rBHET), exclusive of their units, were put in Equation (1) to calculate the first thermal resistance index (without a unit).

Test Example 2: Second Thermal Resistance Index

The second thermal resistance index of the following Equation (2) was calculated for the polyester resins.

Second thermal resistance index=(G/A)×0.32+0.83 . . . (2) In Equation (2), G and A are each the number of moles of glycol and the number of moles of diacid in the monomers constituting the polyester resin, and G/A is the mole ratio of glycol to diacid.

Test Example 3: Third Thermal Resistance Index

The third thermal resistance index of the following Equation (3) was calculated using the first thermal resistance index and the second thermal resistance index obtained above.

Third thermal resistance index=first thermal resistance index+second thermal resistance index . . . (3)

Test Example 4: Amount of DEG Formed

The content (% by mole) of a diethylene glycol monomer among the total glycol components contained in the monomer mixture supplied for the polymerization of the polyester resin was calculated, which was referred to as the "amount of DEG added." In addition, the content (% by mole) of diethylene glycol residue relative to the total glycol residues contained in the final polyester resin upon polymerization was calculated, which was referred to as the "amount of residual DEG." The content of the diethylene glycol residue was determined from a 4I-NMR spectrum obtained at 25° C. using a nuclear magnetic resonance apparatus (JEOL, 600 MHz FT-NMR) by dissolving each polyester resin in a $CDCl_3$ solvent at a concentration of 3 mg/ml.

They were used to calculate the amount of DEG formed according to the following Equation (B).

Amount of DEG formed=amount of residual DEG−amount of DEG added (B)

Test Example 5: Intrinsic Viscosity (IV)

A polyester resin was dissolved at a concentration of 0.12% in orthochlorophenol (OCP) at 150° C. to obtain a solution, and an Ubbelohde viscometer was used in a constant temperature bath at 35° C. to measure intrinsic viscosity. Specifically, the temperature of the viscous tube was maintained at 35° C., and the time (efflux time) required for the solvent to pass between specific internal sections of the viscous tube and the time required for the solution to pass to obtain specific viscosity, which was used to calculate intrinsic viscosity.

Test Example 6: Glass Transition Temperature (Tg)

The glass transition temperature (Tg) of each polyester resin was measured by differential scanning calorimetry (DSC). DSC 1 model of Mettler Toledo was used as the measuring device. Specifically, a polyester resin sample to be analyzed was dried for 5 to 10 hours in a nitrogen atmosphere at 60° C. using a dehumidifying dryer (model name D2T of Moreto). Thus, Tg was measured under the condition that the residual water content in the sample was less than 500 ppm. About 6-10 mg of the dried sample was taken, filled in an aluminum pan, heated from room temperature to 280° C. at a rate of 10° C./minute (first scan), and annealed at 280° C. for 3 minutes. Thereafter, the sample was quenched to room temperature and heated again from room temperature to 280° C. at a rate of 10° C./minute (second scan) to obtain a DSC curve. In addition, the Tg value was analyzed in the DSC second scan through the glass transition function in the DSC menu of the program (STARe software) provided by Mettler Toledo. Here, Tg is defined as the temperature at which the maximum slope of the curve appears at the point where the DSC curve obtained in the second scan first changes stepwise during the heating procedure. The temperature range of the scan was set from −20° C. to 15° C. to 15° C. to 20° C. of the midpoint calculated by the program.

Test Example 7: Heat Shrinkage Rate (1) Preparation of a Polyester Film

Each polyester resin was extruded through a die at a temperature of 250-290° C. and cast at a temperature of 20-50° C. The cast film was stretched 5 times only in the transverse direction (TD) while reheated at 75 to 90° C. (i.e., MD stretch ratio:TD stretch ratio=1:5). As a result, a polyester film having a thickness of 50 lam was obtained.

(2) Measurement of Heat Shrinkage Rates

The heat shrinkage rate was measured for the polyester film as follows.

Each film was cut into a length of 5 cm×a width of 5 cm and stored at room temperature (20° C.).

Thermal treatment conditions: The film sample was immersed in hot water at 70° C. for 10 seconds and then taken out.

The dimensions before thermal treatment (that is, dimensions at room temperature) and after thermal treatment were measured in the transverse direction (TD) of the film sample, and the heat shrinkage rate was calculated according to the following equation.

Heat shrinkage rate (%)=[(dimension before thermal treatment−dimension after thermal treatment)/dimension before thermal treatment]×100

In addition, the dimensions before and after thermal treatment were measured in the longitudinal direction (MD), and the heat shrinkage rate was calculated according to the above equation. Then, the heat expansion rate (%) was calculated by multiplying the above by −1. Thereafter, the sum of the heat shrinkage rate (%) in the transverse direction (TD) and the heat expansion rate in the longitudinal direction (MD) was obtained.

Test Example 8: Slope of heat shrinkage rate

The slope of heat shrinkage rate according to the following Equation (A) was obtained through the methods of Test Examples 6 to 8.

$$\text{Slope } (\%/°C.) = \frac{HS1\,(\%) - HS2\,(\%)}{5°C.} \times 100 \quad (A)$$

In Equation (A), HS1 is the heat shrinkage rate (%) at the glass transition temperature (Tg), HS2 is the heat shrinkage rate (%) at a temperature of the glass transition temperature (Tg) −5° C., and the heat shrinkage rate is measured in the transverse direction (TD) of the film at each temperature.

The results are shown in Tables 4 and 5 below.

TABLE 4

|  |  | Unit | Ex. 1 | Ex. 2 | Ex. 3 | Ex. 4 | Ex. 5 | Ex. 6 |
|---|---|---|---|---|---|---|---|---|
| Thermal resistance index of a resin | First thermal resistance index |  | 0.21 | 0.37 | 0.62 | 0.18 | 0.38 | 0.28 |
|  | Second thermal resistance index |  | 1.29 | 1.55 | 1.38 | 1.21 | 1.38 | 1.37 |
|  | Third thermal resistance index |  | 1.50 | 1.92 | 2.01 | 1.38 | 1.77 | 1.65 |
| Resin composition | Amount of DEG added | % by mole | 8.0 | 10.0 | 10.0 | 11.0 | 0.0 | 9.0 |
|  | Amount of DEG formed | % by mole | 2.2 | 2.9 | 3.0 | 2.1 | 2.7 | 2.5 |
|  | Amount of residual DEG | % by mole | 10.2 | 12.9 | 13.0 | 13.1 | 2.7 | 11.5 |
|  | Amount of residual CHDM | % by mole | 32 | 20 | 16.4 | 22 | 21.2 | 20 |
| Physical properties | Intrinsic viscosity | dl/g | 0.80 | 0.65 | 0.75 | 0.82 | 0.78 | 0.65 |
| Thermal resistance characteristics | Tg | ° C. | 72.8 | 70.7 | 70.6 | 70.5 | 78.9 | 71.8 |
|  | Tg - 5° C. | ° C. | 67.8 | 65.7 | 65.6 | 65.5 | 73.9 | 66.8 |
| Thermal shrinkage rate (%) (TD) | at Tg | % | 30.0 | 27.3 | 33.8 | 48.8 | 21.1 | 23.9 |
|  | at Tg - 5° C. | % | 5.6 | 5.0 | 14.1 | 21.3 | 3.8 | 1.9 |
| Shrinkage evaluation | Slope | %/° C. | 488 | 446 | 394 | 550 | 346 | 440 |
| 70° C., 10 sec. | TD heat shrinkage rate + MD heat expansion rate | % | 45 | 40 | 32 | 62 | 10 | 35 |

TABLE 5

|  |  | Unit | C. Ex. 1 | C. Ex. 2 | C. Ex. 3 |
|---|---|---|---|---|---|
| Thermal resistance index of a resin | First thermal resistance index |  | 2.43 | 2.41 | 3.38 |
|  | Second thermal resistance index |  | 1.32 | 1.64 | 1.35 |
|  | Third thermal resistance index |  | 3.75 | 4.05 | 4.73 |
| Resin composition | Amount of DEG added | % by mole | 8.0 | 10.0 | 11.0 |
|  | Amount of DEG formed | % by mole | 5.6 | 6.1 | 7.1 |
|  | Amount of residual DEG | % by mole | 13.6 | 16.1 | 18.1 |
|  | Amount of residual CHDM | % by mole | 32 | 22 | 15 |
| Physical properties | Intrinsic viscosity | dl/g | 0.50 | 0.70 | 0.60 |
| Thermal resistance characteristics | Tg | ° C. | 70.1 | 68.1 | 66.5 |
|  | Tg - 5° C. | ° C. | 65.1 | 63.1 | 61.5 |
| Thermal shrinkage rate (%) (TD) | at Tg | % | Uneven stretching | 33.4 | 36.3 |
|  | at Tg - 5° C. | % | x | 0.67 | 4.3 |
| Shrinkage evaluation | Slope | %/° C. | x | 654.6 | 640 |
| 70° C., 10 sec. | TD heat shrinkage rate + MD heat expansion rate | % | Uneven shrinkage | 68 | 66 |

As can be seen from the above tables, the polyester resins of Examples 1 to 6 had a first thermal resistance index of 1.0 or less, a second thermal resistance index of 1.6 or less, and a third thermal resistance index of 2.0 or less. All of them were excellent in intrinsic viscosity. In contrast, the polyester resins of Comparative Examples 1 to 3 had thermal resistance indices outside the preferred ranges, and their melt intrinsic viscosities were relatively poor.

In particular, the polyester resins of Examples 1 to 6 had an amount of DEG formed of 5% by mole or less and a high glass transition temperature (Tg), resulting in excellent thermal resistance. The slope of the heat shrinkage rate of each film prepared therefrom was 600%/° C. or less, indicating good shrinkage characteristics, and the TD heat shrinkage rate+MD heat expansion rate at low temperature (70° C.) was good to be 65% or less. In contrast, the polyester resins of Comparative Examples 1 to 3 had an amount of DEG formed of greater than 5% by mole and a relatively low glass transition temperature (Tg), resulting in poor thermal resistance. The slope of the heat shrinkage rate of the film prepared therefrom was greater than 600%/° C., indicating poor shrinkage characteristics, and the TD heat shrinkage rate+MD heat expansion rate at low temperature (70° C.) was either greater than 65% or non-uniform, which is hardly applicable to a commercial heat shrinkable film process.

The invention claimed is:

1. A polyester resin, which comprises recycled bis(2-hydroxyethyl) terephthalate obtained through the depolymerization of waste polyester, wherein the slope of heat shrinkage rate calculated by the following Equation (A) is 600%/° C. or less:

$$\text{Slope } (\%/°C.) = \frac{HS1\ (\%) - HS2\ (\%)}{5°C.} \times 100 \quad \text{(A)}$$

in Equation A), HS1 is the heat shrinkage rate (%) at the glass transition temperature (Tg), and HS2 is the heat shrinkage rate (%) at a temperature of the glass transition temperature (Tg) −5° C., wherein, after the polyester resin is extrusion molded into a film shape and then stretched 5 times in the transverse direction (TD), the heat shrinkage rate is measured in the transverse direction (TD) of the film at each temperature.

2. The polyester resin of claim 1, wherein the recycled bis(2-hydroxyethyl) terephthalate has a peak area fraction of diethylene glycol esters of less than 2% in total when measured by high-performance liquid chromatography (HPLC).

3. The polyester resin of claim 1, wherein, in the polyester resin, the amount of DEG formed as calculated by the following Equation (B) is 5% by mole or less:

Amount of DEG formed=amount of residual DEG− amount of DEG added  (B)

in Equation (B), the amount of residual DEG is the content (% by mole) of diethylene glycol residue among the total glycol residues in the polyester resin measured by $^1$H-NMR, and the amount of DEG added is the content (% by mole) of a diethylene glycol monomer in the total glycol components added to the production of the polyester resin.

4. The polyester resin of claim 1, wherein the polyester resin has a first thermal resistance index of 1.0 or less as calculated by the following Equation (1):

$$\text{First thermal resistance index} = \frac{(DEG_1 + 2 \times DEG_2) \times rBHET}{BHET_0} \quad (1)$$

in Equation (1), $DEG_1$, $DEG_2$, and $BHET_0$ are each the peak area fraction (%) of 2-hydroxyethyl[2-(2-hydroxyethoxy)ethyl] terephthalate, bis[2-(2-hydroxyethoxy)ethyl]benzene-1,4-dicarboxylate, and bis(2-hydroxyethyl) terephthalate, when the recycled bis(2-hydroxy ethyl) terephthalate is measured by high-performance liquid chromatography (HPLC), and rBHET is the weight fraction (%) of recycled bis(2-hydroxyethyl) terephthalate in the polyester resin.

5. The polyester resin of claim 4, wherein the polyester resin has a second thermal resistance index of 1.6 or less as calculated by the following Equation (2):

Second thermal resistance index=(G/A)×0.32 +0.83  (2)

in Equation (2), G and A are each the number of moles of glycol and the number of moles of diacid in the monomers constituting the polyester resin, and G/A is the mole ratio of glycol to diacid.

6. The polyester resin of claim 5, wherein the polyester resin has a third thermal resistance index of 2.0 or less as calculated by the following Equation (3):

Third thermal resistance index=first thermal resistance index+second thermal resistance index  (3).

7. The polyester resin of claim 1, wherein the recycled bis(2-hydroxyethyl) terephthalate is employed in an amount of 10% by weight to 99% by weight based on the weight of the polyester resin.

8. The polyester resin of claim 1, wherein the polyester resin comprises a diacid component and a glycol component, the diacid component comprises at least one selected from the group consisting of terephthalic acid, isophthalic acid, dimethyl isophthalate, phthalic acid, dimethyl phthalate, phthalic anhydride, 2,6-naphthalenedicarboxylic acid, dimethyl 2,6-naphthalenedicarboxylate, diphenyl dicarboxylic acid, 1,4-cyclohexanedicarboxylic acid, 1,3-cyclohexanedicarboxylic acid, dimethyl 1,4-cyclohexanedicarboxylate, dimethyl 1,3-cyclohexanedicarboxylate, sebacic acid, succinic acid, isodecylsuccinic acid, maleic acid, maleic anhydride, fumaric acid, adipic acid, glutaric acid, and azelaic acid, and the glycol component comprises at least one selected from the group consisting of isosorbide, ethylene glycol, 1,2-propanediol, 1,3-propanediol, 2-methyl-1,3-propanediol, 2-methylene-1,3-propanediol, 2-ethyl-1,3-propanediol, 2-isopropyl-1,3-propanediol, 2,2-dimethyl-1,3-propanediol, 1,4-butanediol, 2,3-butanediol, 3-methyl-1,5-pentanediol, 3-methyl-2,4-pentanediol, 1,6-hexanediol, 1,2-cyclohexanediol, 1,4-cyclohexanediol, diethylene; glycol, 4-(hydroxymethyl)cyclohexylmethyl-4-(hydroxymethyl)cyclohexanecarboxylate, and 4-(4-(hydroxymethyl)cyclohexylmethoxymethyl)cyclohexylmethanol.

9. The polyester resin of claim 1, wherein the polyester resin has an intrinsic viscosity (IV) at 35° C. of 0.5 dl/g to 0.9 dl/g.

10. A process for preparing a polyester resin, which comprises polymerizing a polyester resin using recycled bis(2-hydroxyethyl) terephthalate obtained through the depolymerization of waste polyester, wherein the recycled bis(2-hydroxyethyl) terephthalate has a peak area fraction of diethylene glycol esters of less than 2% in total when measured by high-performance liquid chromatography (HPLC), and the slope of heat shrinkage rate calculated by the following Equation (A) in the polyester resin is 600%/° C. or less:

$$\text{Slope } (\%/°C.) = \frac{HS1\ (\%) - HS2\ (\%)}{5°C.} \times 100 \quad \text{(A)}$$

in Equation (A), HS1 is the heat shrinkage rate (%) at the glass transition temperature (Tg), and HS2 is the heat shrinkage rate (%) at a temperature of the glass transition temperature (Tg) −5° C., wherein, after the polyester resin is extrusion molded into a film shape and then stretched 5 times in the transverse direction (TD), the heat shrinkage rate is measured in the transverse direction (TD) of the film at each temperature.

11. An article, which comprises the polyester resin of claim 1.

12. The article of claim 11, wherein the article is a film, a sheet, or a profile.

13. A heat shrinkable polyester film, which comprises the polyester resin of claim 1, wherein the slope of heat shrinkage rate calculated by the following Equation (A) is 600%/° C. or less:

$$\text{Slope } (\%/°C.) = \frac{HS1\ (\%) - HS2\ (\%)}{5°C.} \times 100 \tag{A}$$

in Equation (A), RS1 is the heat shrinkage rate (%) at the glass transition temperature (Tg), and HS2 is the heat shrinkage rate (%) at a temperature of the glass transition temperature (T 5° C., wherein the heat shrinkage rate is measured in the transverse direction (TD) of the film at each temperature.

14. The heat shrinkable polyester film of claim 13, wherein the heat shrinkable polyester film has a sum of a heat shrinkage rate (%) in the transverse direction (TD) and a heat expansion rate (%) in the longitudinal direction (MD) of 65% or less at 70° C.

* * * * *

UNITED STATES PATENT AND TRADEMARK OFFICE
CERTIFICATE OF CORRECTION

PATENT NO. : 12,018,118 B2
APPLICATION NO. : 18/569279
DATED : June 25, 2024
INVENTOR(S) : Da-Young Hwang et al.

It is certified that error appears in the above-identified patent and that said Letters Patent is hereby corrected as shown below:

In the Claims

In Column 33, Line 20, please change "Equation (A), RS1" to --Equation (A), HS1--

Signed and Sealed this
Sixth Day of August, 2024

Katherine Kelly Vidal
Director of the United States Patent and Trademark Office